United States Patent [19]
Mimura

[11] Patent Number: 5,865,071
[45] Date of Patent: Feb. 2, 1999

[54] DIFFERENTIAL GEAR SETTING DIFFERENTIAL LIMITING FORCES IN RESPONSE TO ROTATIONAL FORCE TRANSMISSION DIRECTION

[76] Inventor: Kenji Mimura, 29-1105, Wakabadai 4-chome, Asahi-ku, Yokohama, Kanagawa-ken, 241, Japan

[21] Appl. No.: 777,478

[22] Filed: Dec. 30, 1996

[30] Foreign Application Priority Data

Dec. 28, 1995 [JP] Japan .................................... 7-342631

[51] Int. Cl.⁶ .................................................. F16H 48/20
[52] U.S. Cl. ............................................. 74/650; 475/196
[58] Field of Search ................................. 74/650, 665 F, 74/665 G, 721; 475/196

[56] References Cited

U.S. PATENT DOCUMENTS

| | | | |
|---|---|---|---|
| 2,467,870 | 4/1949 | Stephenson | 475/196 |
| 2,642,213 | 1/1953 | Schott | 74/650 |
| 2,967,438 | 1/1961 | Altmann | 74/650 |
| 5,286,239 | 2/1994 | Ito et al. | 74/650 |
| 5,312,306 | 5/1994 | Folino | 475/196 |
| 5,540,119 | 7/1996 | Hudson | 74/650 |
| 5,577,423 | 11/1996 | Mimura | 74/650 |

FOREIGN PATENT DOCUMENTS 184916 8/1922 United Kingdom ..................... 74/650

*Primary Examiner*—Charles A. Marmor
*Assistant Examiner*—Sherry Lynn Estremsky
*Attorney, Agent, or Firm*—Pollock, Vande Sande & Amernick

[57] ABSTRACT

A differential gear is capable of differentially setting magnitudes of differential limiting forces depending on directions of rotational force transmission. A rotational force of the input-side rotary element is transmitted by way of rolling elements and grooves to the rotary elements. The rolling elements roll along grooves of the rotary elements while reciprocating within elongated holes of the retainer element, thereby permitting the difference in speeds of rotation between the rotary elements. The differential motions of the rotary elements are limited by axial reaction forces generated between the rotary elements and the grooves. At that time, if the directions of the rotational force transmission between the input-side rotary element and the rotary elements differ from each other, then the magnitudes of the axial reaction forces generated between the rotary elements and the grooves will also be different from each other. Hence, differential limiting forces are generated which differ in magnitude from one another depending on the directions of transmission of rotational forces. According to the present invention, therefore, a small and low-cost configuration is achieved and there can be generated differential limiting forces having any magnitudes which differ between upon the acceleration and deceleration of automobiles. A secure coping will thus be ensured with running performances of automobiles, objects of use and combinations with attached mechanisms, thereby remarkably enhancing utility value as the differential gear having a differential limiting function.

4 Claims, 26 Drawing Sheets

F I G. 1
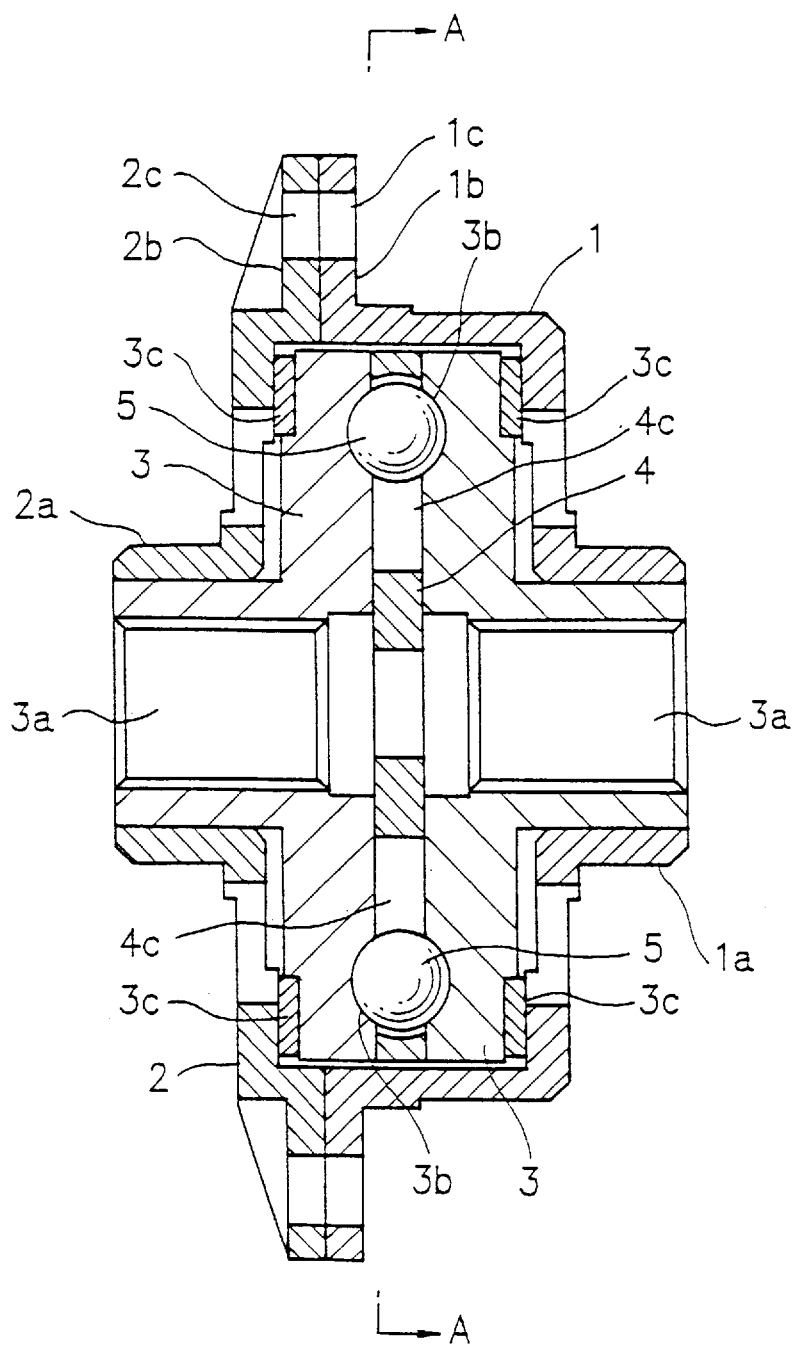

DIFFERENTIAL GEAR SETTING DIFFERENTIAL LIMITING FORCES IN RESPONSE TO ROTATIONAL FORCE TRANSMISSION DIRECTION

BACKGROUND OF THE INVENTION

1. Field of the Invention

The present invention relates to a differential gear permitting differences in speed of rotations for example between the right and left or the front and rear drive wheels of automobiles, and to a method of manufacturing disc-like members for use in the differential gear.

2. Description of the Related Art

Typical automobile differential gears have a pinion gear interposed between a pair of bevel gears coupled to the output shaft so that when the pinion gear shaft is subjected to an external rotational force, the pinion gear is rotated upon the differential motions to permit the difference in speed of rotation between the output shafts. Known as a differential gear having a differential limiting function for restricting the idling of one of the drive wheels during turning or at the travel on the surface of road having a lower frictional force is one having an additional differential limiting mechanism such as for example a viscos coupling making use of resistance of the viscos fluid. However, the structure having such an additional specialized mechanism as the differential motion limiting mechanism often suffers from drawbacks of increases in size and cost of the gear body. Thus, the applicant has already proposed a differential gear smaller in size than the conventional structure and capable of achieving the differential limiting effect without needing any additional specialized mechanism (Japanese Patent Laid-open Pub. No. Hei8-170705).

This differential gear comprises a gear case which is rotated by an external force; a pair of disc plates confronting each other and coaxial with the gear case; a plurality of balls arranged between the confronting faces of the pair of disc plates; and a center plate for retaining the balls and rotating together with the gear case. The center plate includes a plurality of elongated holes extending in the radial direction of the disc plates and movably accommodating the balls. The confronting faces of the disc plates are provided with grooves with which the balls are rollingly engaged. The rotational force is transmitted by way of the balls and the grooves to the disc plates. The balls are caused to roll along the grooves of the disc plates while reciprocating within the elongated holes of the center plates, to thereby permit the difference between speeds of rotation of the two disc plates. The differential motion between the disc plates is limited by the axial reaction force generated between the balls and the grooves. Accordingly, this differential gear is advantageous in reduction in number of constituent parts and compactness as well as easy assembling since it effects the differential motion between the disc plates by the engagement of the balls with the grooves and use is made of the mechanical characteristics in that configuration to obtain the differential limiting effect.

In the automobile drive wheels, for example, the differential limiting forces in the differential gear occur both during the acceleration and deceleration. When the directions of transmission of rotational forces to the drive wheels differ between during the acceleration and deceleration due to the automobile travel performances, objects of use, or combinations with the attached mechanisms, it would be desirable that the magnitudes of the differential limiting forces also be set so as to differ from each other. In the automobiles equipped with an ABS (anti-lock braking system) for preventing any slip during braking operation, it would be necessary to prevent the drive wheels from being locked by reducing the differential limiting force which may occur during the deceleration in view of controlling the braking force relative to the surface of road on a wheel-to-wheel basis.

SUMMARY OF THE INVENTION

The present invention was conceived in view of the above problems. It is therefore an object of the present invention to provide a differential gear capable of differentially setting the magnitudes of differential limiting forces depending on the directions of transmission of rotational forces.

According to a first aspect of the present invention, in order to achieve the above object, the differential gear comprises an input-side rotary element which is rotated by an external drive force; a pair of rotary elements confronting each other and arranged coaxially with the input-side rotary element; a plurality of rolling elements interposed between confronting faces of the rotary elements; and a retainer element rotating integrally with the input-side rotary element for retaining the plurality of rolling elements; in which the retainer element includes a plurality of elongated holes extending in the radial direction of the pair of rotary elements, the plurality of elongated holes movably accommodating the plurality of rolling elements in a corresponding manner, and in which the confronting faces of the pair of rotary elements are each provided with a groove with which each of the rolling elements is rollingly engaged, wherein the magnitudes of angles of contact with the rolling elements in the grooves are so set that when the directions of rotational force transmission between the input-side rotary element and the rotary elements differ from each other, the magnitudes of axial reaction forces generated between the rolling elements and the grooves are also different from each other. Due to this arrangement, a rotational force of the input-side rotary element is transmitted by way of rolling elements and grooves to the rotary elements. The rolling elements roll along grooves of the rotary elements while reciprocating within elongated holes of the retainer element, thereby permitting the difference in speeds of rotation between the rotary elements. The differential motions of the rotary elements are limited by axial reaction forces generated between the rotary elements and the grooves. At that time, if the directions of the rotational force transmission between the input-side rotary element and the rotary elements differ from each other, then the magnitudes of the axial reaction forces generated between the rotary elements and the grooves will also be different from each other. Hence, differential limiting forces are generated which differ in magnitude from one another depending on the directions of transmission of rotational forces.

According to the present invention, therefore, a small and low-cost configuration is achieved and there can be generated differential limiting forces having any magnitudes which differ between upon the acceleration and deceleration of the automobiles. A secure coping will thus be ensured with running performances of the automobiles, objects of use and combinations with attached mechanisms, thereby remarkably enhancing utility value as the differential gear having a differential limiting function.

In the present invention, to accomplish the above object, the grooves formed in the rotary elements each may include a first guide segment extending from the radially inner side of the rotary element toward the outer side thereof, and a second guide segment extending from the radially outer side of the rotary element toward the inner side thereof, the first and second guide segments being circumferentially continuous with each other. The magnitude of angles of contact with the rolling elements in the grooves are preferably so set that it is larger on the radially inner side in one guide segment than on the radially inner side in the other guide segment and that it is smaller on the radially outer side in one guide segment than on the radially outer side in the other guide segment.

According to a second aspect of the present invention, to achieve the above object, in the differential gear including an input-side rotary element which is rotated by an external drive force; a pair of rotary elements confronting each other and coaxial with the input-side rotary element; a plurality of rolling elements arranged on the peripheries of the pair of rotary elements; and a plurality of retainer elements each retaining one pair of the rolling elements and moving in the axial directions of the rotary elements while rotating together with the input-side rotary element; the peripheries of the rotary elements being each provided with a groove with which the rolling elements are rollingly engaged; the differential gear comprises one frictional element which generates a frictional force due to a reaction force acting in one direction of rotational force transmission between the input-side rotary element and the rotary elements; and the other frictional element which generates a frictional force due to a reaction force acting in the other direction of rotational force transmission between the input-side rotary element and the rotary elements; frictional forces generated by the frictional elements being set to be different depending on the directions of rotational force transmission. By virtue of this arrangement, a rotational force of the input-side rotary element is transmitted by way of rolling elements and grooves to the rotary elements. The rolling elements roll along grooves of the rotary elements while reciprocating within elongated holes of the retainer element, thereby permitting the difference in speeds of rotation between the rotary elements. The differential motions of the rotary elements are limited by axial reaction forces generated between the rotary elements and the grooves. At that time, if the directions of the rotational force transmission between the input-side rotary element and the rotary elements differ from each other, then the magnitudes of the axial reaction forces generated between the rotary elements and the grooves will also be different from each other. Hence, differential limiting forces are generated which differ in magnitude from one another depending on the directions of transmission of rotational forces.

In the present invention, to accomplish the above object, the grooves formed in the rotary elements each include a first guide segment in which the rolling elements are caused to move from axially one end side of the rotary elements toward the other end side thereof, and a second guide segment in which the rolling elements are caused to move from axially the other end side toward one end side, the first and second segments being circumferentially continuous with each other, only one of the first guide segment and the second guide segment allowing rotational forces of the input-side rotary element and the rotary members to be transmitted by way of the rolling elements. Owing to this arrangement, the axial reaction forces generated between the rolling elements and the grooves are allowed to be exerted only in the opposite directions when the directions of rotational force transmission differ from each other, thereby ensuring an acquisition of a constantly stabilized differential limiting force in respective transmitting directions of rotational forces in addition to the above effect. This would be extremely advantageous for practical use.

To accomplish the above object, the differential gear of the present invention may further comprise pressure imparting means for urging the rotary elements axially inwardly or axially outwardly at a predetermined pressure. In addition to the above effect, this would assist the differential limiting forces by restricting the rotations of the rotary elements due to pre-load toward the axially inside of the rotary elements from the pressure imparting means, whereby an effective presentation of the differential limiting effect is ensured even on the surface of road having a low friction coefficient.

In order to achieve the above object, the differential gear of the present invention may further comprise frictional force generation means for generating a frictional force by rotations of the rotary elements through the reception of axial reaction forces occurring in the rotary elements. In addition to the above effect, this will make it possible to give birth to a more powerful differential limiting force through the restriction of rotations of the rotary elements by use of the frictional force generation means, This would be advantageous in the case where an enhanced differential limiting effect is desired.

It is another object of the present invention to manufacture with ease a disc-like member for use in the rotary element of the differential gear.

According to a third aspect of the present invention, to achieve the another object, there is provided a method of manufacturing a disc-like member comprising the steps of forming cuttingly on one end face of a disc-like member in a circumferentially continuous manner a groove extending from the radially inner side of the disc-like member toward the outer side thereof and a groove extending from the radially outer side of the disc-like member toward the inner side thereof, by moving a first cutting blade along a predetermined cutting path around an axis of the disc-like member, the first cutting balde intended to form a groove having a predetermined angle of contact with a ball; displacing the disc-like member around the axis in a rotational direction by a predetermined angle; and moving a second cutting blade along the same cutting path as that of the first cutting blade to thereby cut a part of the groove formed by the first cutting blade, the second blade intended to form a groove having an angle of contact with the ball differing from that of the first cutting blade. As a result, the groove formed by the first cutting blade is formed to have alternately different angels of contact with balls between on the radially inner side and the radially outer side in such a manner that one of the radially inside and outside is cut by the second cutting blade in the groove segment extending from the radially inner side of the disc-like member toward the outer side thereof and that the other of the radialy inner and outer sides is cut by the second cutting blade in the groove segment extending from the radially outer side toward the inner side.

Thus, the present invention will ensure an easy formation of the groove having alternately different angles of contact with balls between on the radially inner side and outer of the groove in the disc-like member. This would be extremely advantageous in manufacturing the disc-like members for use in the differential gears.

BRIEF DESCRIPTION OF THE DRAWINGS

These and other objects, features and advantages of the present invention will become more apparent from the following detailed description with reference to the accompanying drawings, in which:

FIG. 1 is a side sectional view of a differential gear of a first embodiment of the present invention;

DESCRIPTION OF THE PREFERRED EMBODIMENTS

Figure 2:
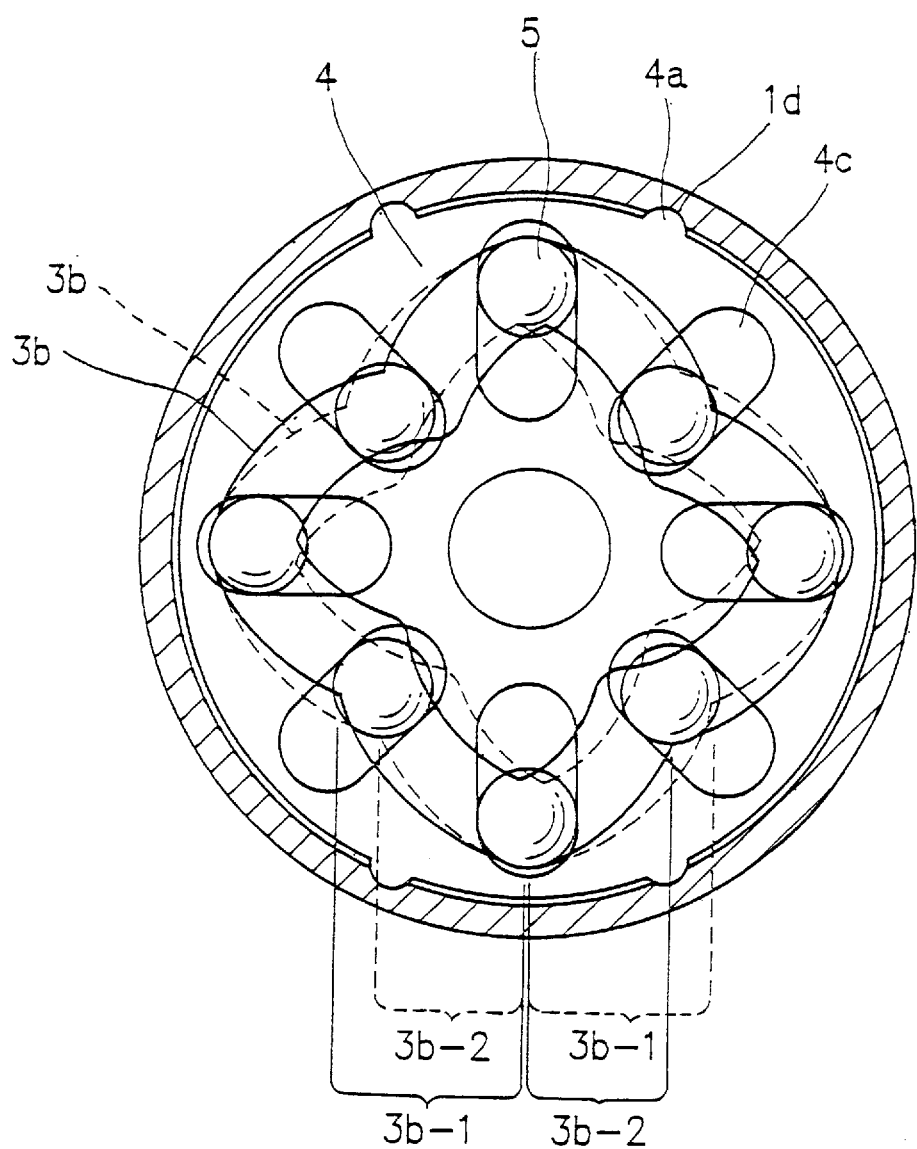
FIG. 2 is a sectional view taken along a line A—A of FIG. 1 and viewed from the direction of the arrow.
Figure 3:
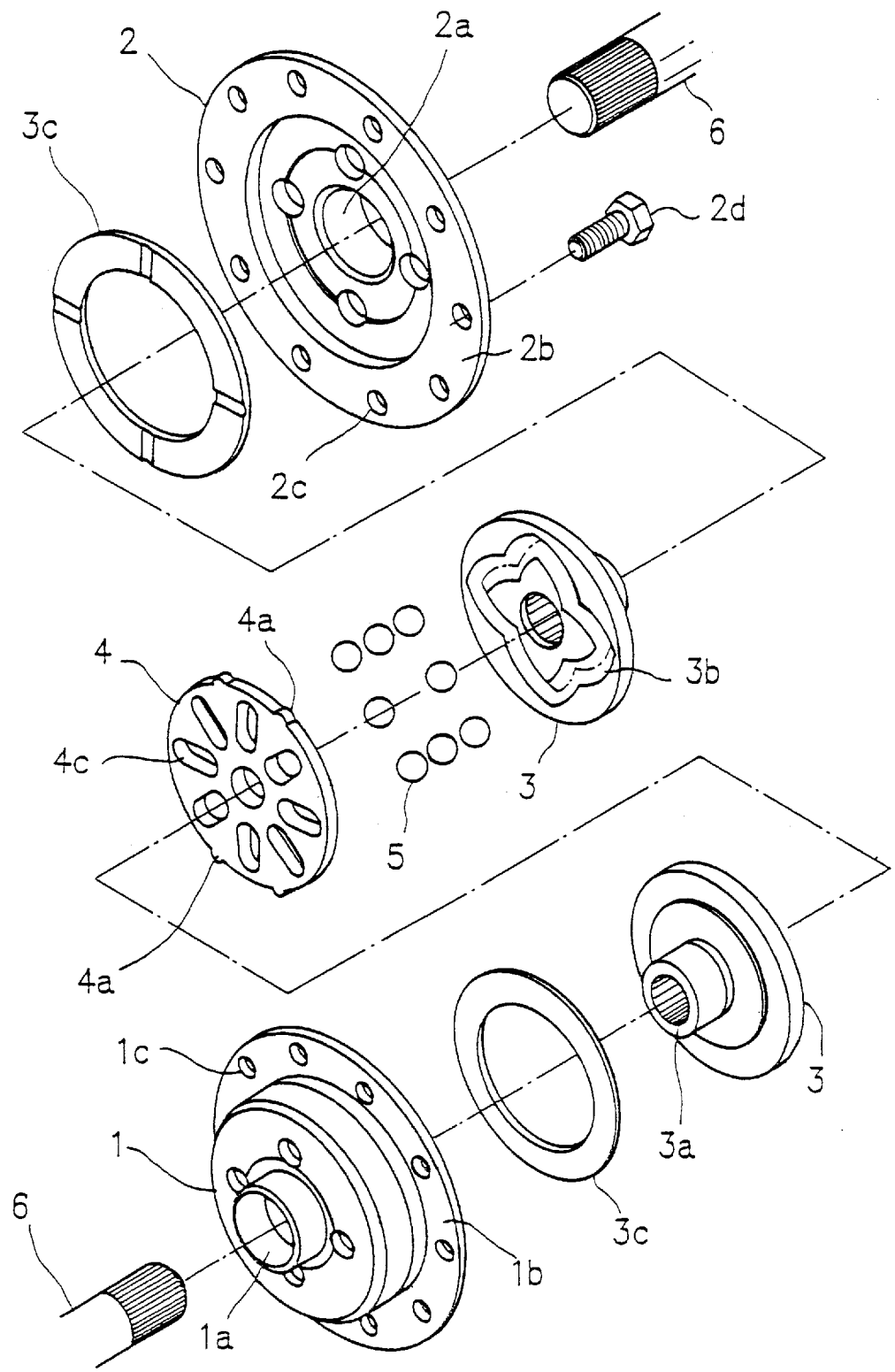
FIG. 3 is an exploded perspective view of the differential gear.

Referring to FIGS. 1 to 11 there is depicted a first embodiment of the present invention. A differential gear of this embodiment comprises a gear case 1; a gear case cover 2 for closing one end of the gear case 1; a pair of disc plates 3 coaxially confronting each other; a center plate 4 interposed between the pair of disc plates 3; and a multiplicity of balls 5 rotatably retained within the center plate 4; the disc plates 3, the balls 5 and the center plate 4 serving respectively as rotational elements, rolling elements and a retainer for retaining the rolling elements.

The gear case 1 is in the shape of a cylinder with one open end and has at its center a bearing 1$a$ which supports one of the pair of disc plates 3. The gear case 1 includes a circumferentially extending flange 1$b$ provided with a multiplicity of holes 1$c$ for insertion of bolts. The gear case 1 further includes a groove 1$d$ formed in its inner surface for securing the center plate 4.

The gear case cover 2 is shaped into a disc having at its center a bearing 2$a$ which supports the other of the disc plates 3. The gear case cover 2 includes a circumferentially extending flange 2$b$ provided with a multiplicity of holes 2$c$ for insertion of bolts. The gear case cover 2 is mounted on the gear case 1 by means of bolts 2$d$ for fastening the flanges 1$b$ and 2$b$ together.

The pair of disc plates 3 are formed at one end with flat confronting faces and at the other ends with a connection 3$a$ for receiving a drive shaft 6 associated with wheels. The flat confronting faces of the disc plates 3 are each provided with a groove 3$b$ which extends circumferentially in a continuous manner and with which the balls 5 are intended to rollingly engage. A thrust washer 3$c$ intervenes between the gear case 1 and one of the disc plates 3 and between the gear case cover 2 and the other of the disc plates 3. As best seen in FIG. 2, each groove 3$b$ has a first guide segment 3$b$-1 in which the balls 5 are allowed to move from radially inside of the disc plate 3 toward outside, and a second guide segment 3$b$-2 in which the balls 5 are allowed to move from radially outside of the disc plate 3 toward inside, the first and second segments being arranged alternately and continuously with each other in the circumferential direction. In one disc plate 3 the first guide segment 3$b$-1 is longer in circumferential length than the second guide segment 3$b$-2, whereas in the other disc plate 3 the second guide segment 3$b$-2 is longer in circumferential length than the first guide segment 3$b$-1. Thus, in the confronting faces of the disc plates 3, when ball turning points on one side (on the outside in FIG. 2) of the two grooves 3$b$ are coincident with each other, the ball turning points on the other side (on the inside in FIG. 2) of the two grooves 3$b$ are circumferentially displaced relative to each other.

The center plate 4 has flat end faces and includes protrusions 4a formed on its periphery that are intended to be fitted into grooves 1d provided on the inner peripheral surface of the gear case 1 whereby the center plate 4 is firmly secured to the interior of the gear case 1. The center plate 4 includes circumferentially spaced apart eight elongated holes 4c for rollingly accommodate a corresponding number of balls 5, each elongated hole 4c extending linearly in the radial direction and passing through the thickness of the center plate 4 in the axial direction.

The balls 5 are individually accommodated within the elongated holes 4c and are simultaneously engaged with the two grooves 3b of the disc plates 3.

In the thus constructed differential gear, a ring gear not shown is provided for transmitting a driving force derived from the engine to the flange 1b of the gear case 1, thereby allowing the entire gear to rotate around the axis of the gear case 1. Thus, once the gear case 1 receives a driving force, the center plate 4 rotates together with the gear case 1, the resultant rotational force being transmitted by way of the balls 5 to the grooves 3b of the disc plates 3 and then to the right and left drive shafts 6 coupled to the associated disc plates 3.

Action of the differential gear will now be described on three cases, namely, a first case in which no difference arises between speeds of rotation of the two drive shafts 6, a second case in which a difference arises between speeds of rotation of the two drive shafts 6, and a third case in which only one of the drive shafts 6 is apt to be subjected to idling.

In the first case where the two drive shafts 6 have no difference in speed of rotation, for example, such as when a wheeled vehicle travels straight on a road surface having a sufficient frictional force, there arises no difference between speeds of rotation of the two disc plates 3 so as not to cause rolling of the balls 5, thus allowing the disc plates 3 to rotate integrally with the center plate 4.

Figure 4:
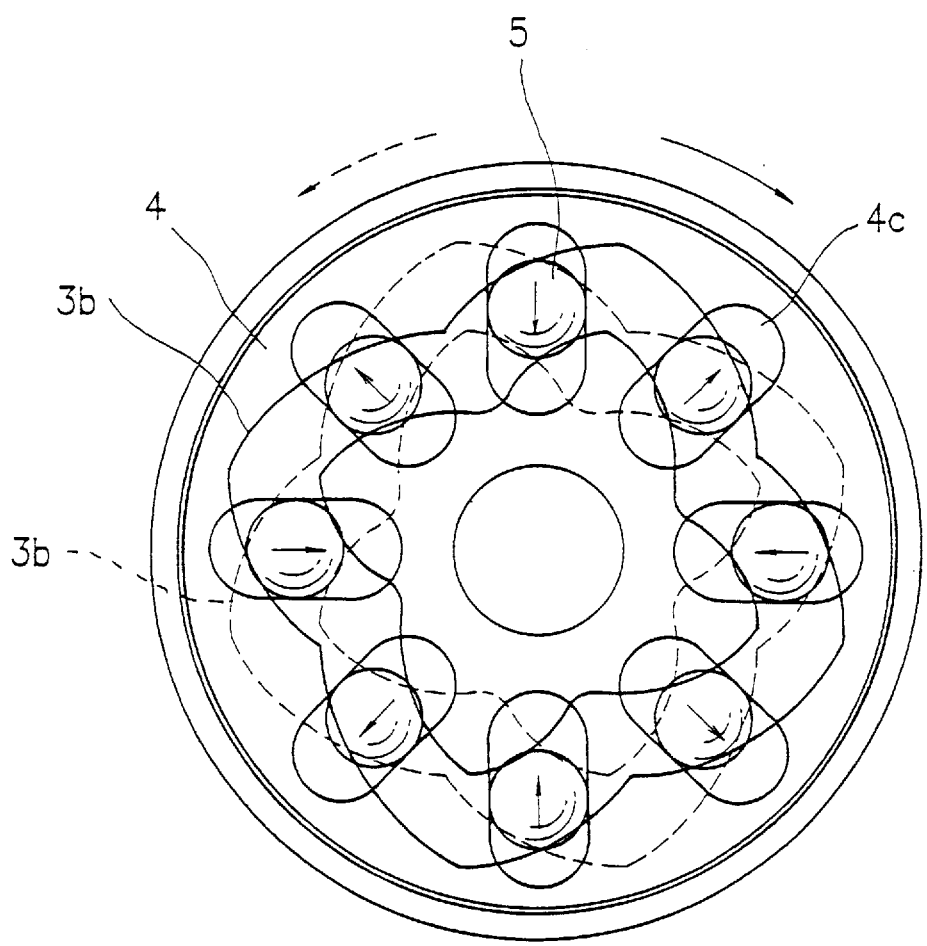
FIG. 4 is an explanatory view of the operation of the differential gear.
Figure 5:
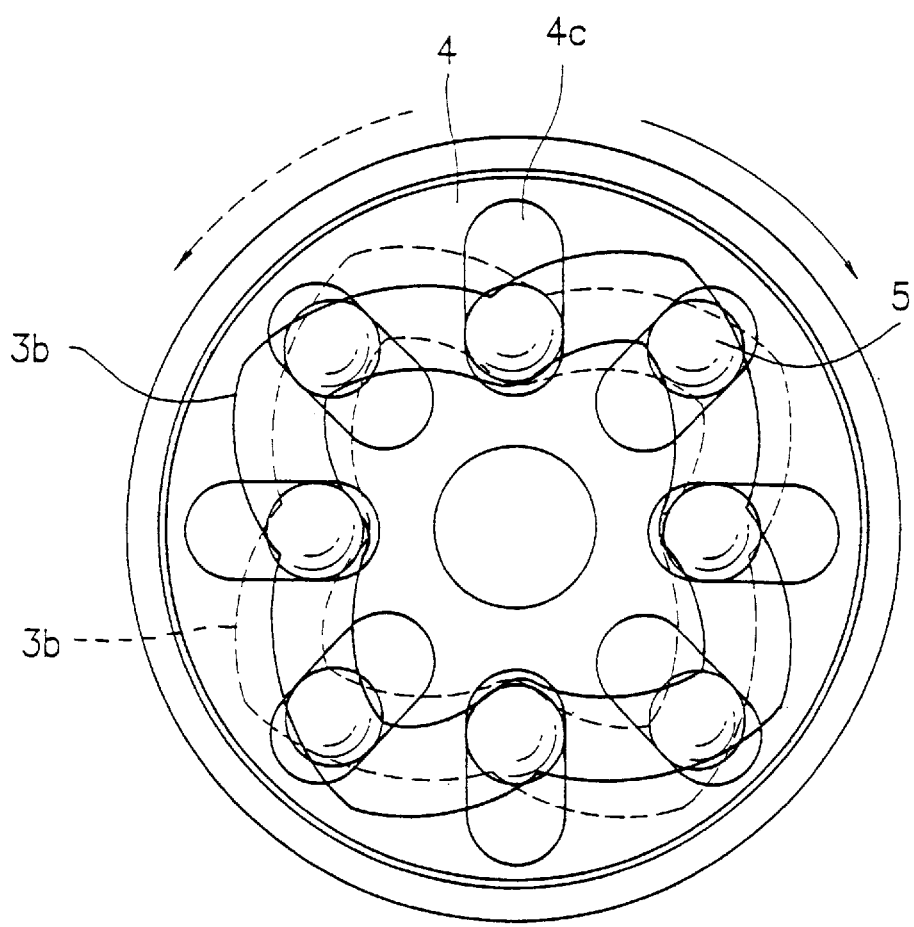
FIG. 5 is an explanatory view of the operation of the differential gear.

In the second case where the two drive shafts 6 are subjected to a difference in speed of rotation with even torques transmitted to the drive wheels, for example, such as when the wheeled vehicle turns on the road surface having a sufficient frictional force, the difference will be permitted between rotational speeds of the two drive shafts 6 by virtue of the action which will be hereinafter described. The two disc plates 3 rotate in opposite directions relative to each other due to the difference in speed of rotation, whereupon the balls 5 received within the elongated holes 4c are rolled by guidance of the grooves 3b so as to reciprocate along the respective elongated holes 4c. The balls 5 lying on the outside in the radial direction in FIG. 2 move radially inwardly along the first guide segments 3b-1 formed in the grooves 3b as shown in FIG. 4. The balls 5 then reach the inside turning points as shown in FIG. 5 and thereafter move radially outwardly along the second guide segments 3b-2 of the grooves 3b. As is apparent from FIG. 2, in this case, every other ball 5 or a half number of balls 5 can reach the outside turning points of the grooves 3b whereas the remainder of the balls 5 does not yet reach the inside turning points since the confronting faces of the disc plates 3 are configured such that when either the inside or outside turning points of the grooves 3b become coincident with each other the remaining turning points are not allowed to coincide with each other. It will therefore be necessary to prevent all of the balls 5 from simultaneously reaching the turning points of the grooves 3b due to the fact that a transmission of force is not to be effected between the balls 5 and the grooves 3b once the balls 5 have reached the turning points of the grooves 3b.

In the third case where only one of the drive shafts 6 is apt to be subjected to idling, for example, such as when one of the drive wheels has lost a frictional force with the surface of a road, the differential of the drive shafts 6 is limited by the action hereinafter described. The grooves 3b can ensure a smooth rolling of the balls 5 when even force brings about a difference between speeds of rotation of the two disc plates 3 as set forth thereinabove. If only one of the disc plates 3 is caused to be rotated from the drive shaft 6 side, however, only the grooves 3b on one hand will serve to roll the balls 5, resulting in a reaction force applied to contact surfaces between the groove 3b and the balls 5. This will act as a resistance making it difficult to allow the rotation of one disc plate 3 to be followed up by the other disc plate 3, thus effecting a limitation in the differential between the drive shafts 6.

Figure 6:
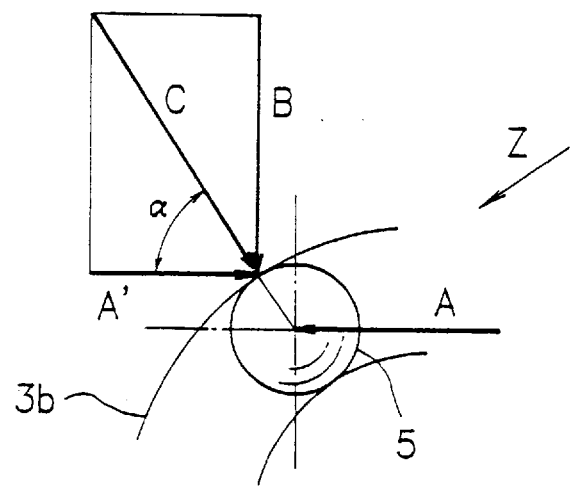
FIG. 6 is an explanatory view of the action of the force applied to the groove by the ball.
Figure 7:
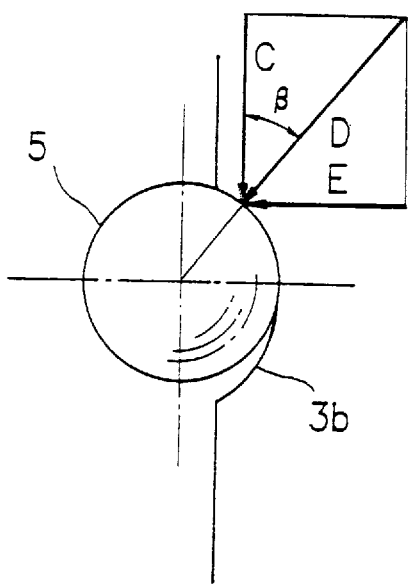
FIG. 7 is an explanatory view of the action of the force applied to the groove by the ball.

Reference is now made to FIGS. 6 and 7 in order to detail a principle of the limitation in differential.

FIG. 6 illustrates the ball 5 and the groove 3b viewed from the direction of axis of the differential gear. A rotational force A around the major axis is shown applied to the center of the ball 5. Herein $$A \approx A' \tag{1}$$

At that time, a normal force C is exerted on the contact surface between the groove 3b and the ball 5, the force C consisting of a component A' extending in parallel to the rotational force A and a component B orthogonal to the component A'. Being normal to the contact surface between the groove 3b and the ball 5, the force C lies on a line passing through the center of the ball 5. Let $\alpha$ be an angle formed between the component A' and the force C, then the magnitude of the force C can be expressed as $$C = A' \times 1/\cos\alpha \tag{2}$$

Then, if the ball 5 and the groove 3b are viewed from the direction of FIG. 6 arrow Z as shown in FIG. 7, an actual normal reaction force D will be applied to the contact surface between the groove 3b and the ball 5, the reaction force D consisting of a component E extending in parallel with the axis of the gear case 1 and of the component C orthogonal to the component E. Since the ball 5 rolls in a slanting contact with the groove 3b, the forces C and E act as forces based on a rolling friction and a sliding friction, the force E being referred to particularly as a thrust force. Being normal to the contact surface between the groove 3b and the ball 5, the reaction force D lies on a line passing through the center of the ball 5. The magnitude of the surface pressure D can be given as $$D = C \times 1/\cos\beta \tag{3}$$

where $\beta$ is an angle formed between D and C.

The magnitude of the thrust force E is given as $$E = C \times \tan\beta \tag{4}$$

From the expressions (1), (2) and (3), the reaction force D is written as follows.

$$D = A \times 1/\cos\alpha \times 1/\cos\beta \tag{5}$$

One component C of D is written from the expressions (1) and (2) as $$C = A \times 1/\cos\alpha \tag{6}$$

The other component of D, that is, thrust force E is written from the expressions (1), (2) and (4) as $$E = A \times 1/\cos \alpha \times \tan \beta \quad (7)$$

In other words, the reaction force D imparted from the groove 3b to the ball 5 is resolved into the components C and E acting as rolling friction and sliding friction based forces, the thrust force E axially urging thrust washers 3c to allow a sliding friction around the major axis to be generated, thus achieving a differential limiting effect. The magnitudes of the contact angles α and β between the ball 5 and the groove 3b are arbitrarily set at that time so as to ensure an acquisition of desired differential limiting effect.

It is to be appreciated that the thrust washers 3c may be replaced by other interventional elements such as bearings to allow arbitrary setting of the degree of differential limiting effect. Factors in achieving the differential limiting effect include a rolling friction generated when the ball 5 rolls along the groove 3b and a sliding friction caused by the ball 5 rolling in slanting contact with the groove 3b.

Figure 8:
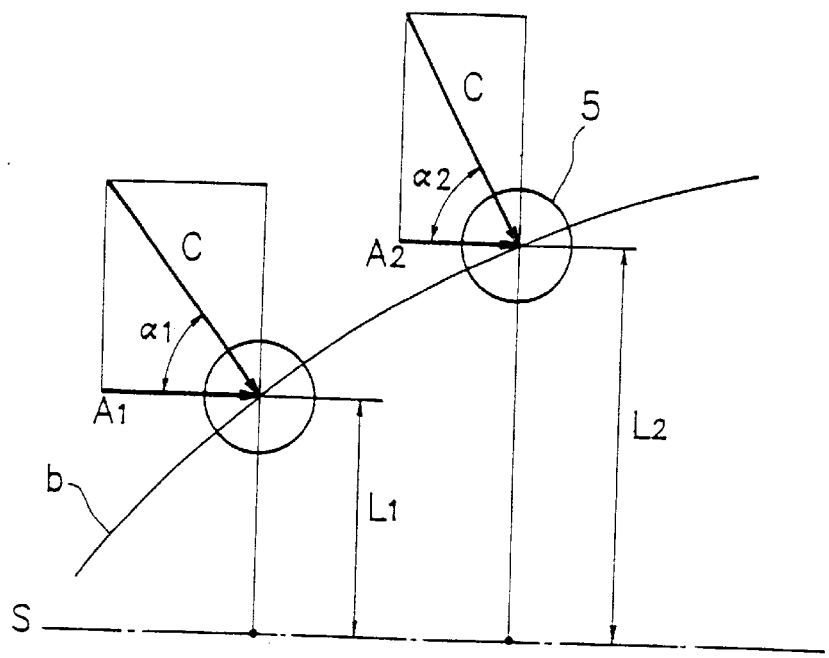
FIG. 8 is an explanatory view of the action of the force based on the difference of distance from the rotational axis to the ball.

It will be understood that when the ball 5 is moved within the associated elongated hole 4b by guidance of the groove 3b, a distance between the ball 5 and the major axis S (axis of the gear case 1) is varied as shown in FIG. 8, resulting in a variation in rotational force A around the major axis S which acts on the contact surface between the ball 5 and the groove 3b.

Accordingly, in order to obtain a constantly unvaried differential limiting effect irrespective of rotational positions of the disc plates 3, the magnitude of the contact angle α or β is continuously varied along with the variation of the rotational force A and in response to the contact position between the ball 5 and the groove 3b so as to ensure a constant frictional force C and thrust force E.

Firstly, in the case of varying the contact angle α, let L1 and L2 be distances between the ball 5 and major axis S at two arbitrary positions as shown in FIG. 8, then the transmission torque T is constantly unvaried and hence the rotational forces A1 and A2 which act on the ball 5 at respective positions can be given as $$A1 = T/L1$$
$$A2 = T/L2 \quad (8)$$

Accordingly, let α1 and α2 be contact angles at respective positions, then the magnitudes of the contact angles α1 and α2 are so set that from the expressions (6) and (8)

$$C = T/L1 \times 1/\cos \alpha1 = T/L2 \times 1/\cos \alpha2 \quad (9)$$

is established, and that from the expression (7)

$$E = T/1 \times 1/\cos \alpha1 \times \tan \beta T/L1 \times 2/\cos \alpha2 \times \tan \beta \quad (10)$$

is established, where β is constant.

Secondly, in the case of varying the contact angle β, let β1 and β2 be contact angles at respective positions, the magnitudes of the contact angles β1 and β2 are so set that from the expressions (6) and (8)

$$C = T/L1 \times 1/\cos \alpha = T/L2 \times 1/\cos \alpha \quad (11)$$

is established, and that from the expression (7)

$$E = T/L1 \times 1 \cos \alpha \times \tan \beta1 T/L1 \times 2/\cos \alpha \times \tan \beta2 \quad (12)$$

is established. Since α is constant in this case, it would be impossible to maintain the frictional force at a certain value from the expression (11). However, the magnitude of the frictional force C is negligible as compared with that of the thrust force E so that substantially constant differential limitating effect can be achieved as long as the thrust force E is constant.

Figure 9:
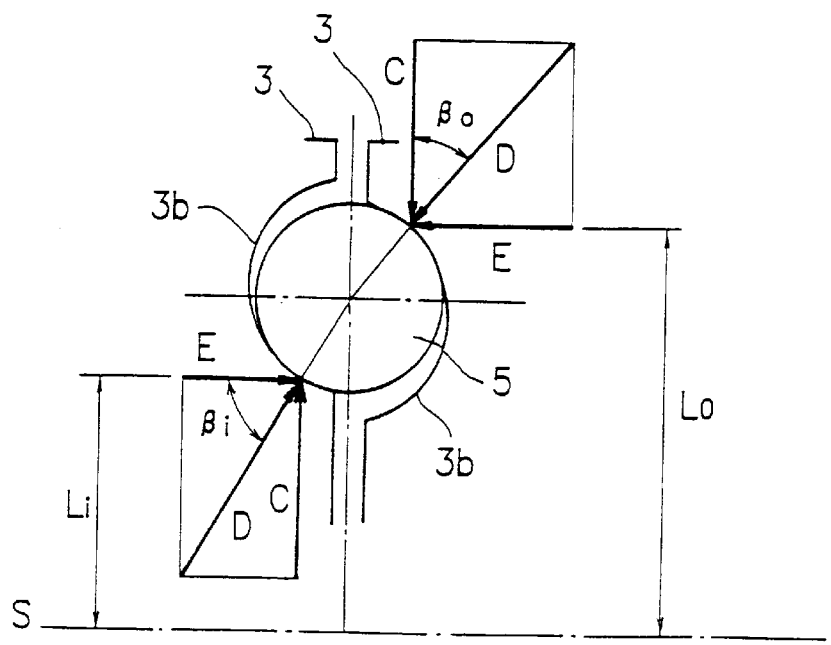
FIG. 9 is an explanatory view of the force applied to the disc plates.

As can be seen from FIG. 9, the same ball 5 comes in contact with one groove 3b at its externally offset position, while simultaneously coming in contact with the other groove 3b at its internally offset position. In spite of the same ball 5, therefore, there is a difference between the distances L0 and L1 from the contact surfaces with the grooves 3b to the major axis S, so that two thrust forces E generated in the respective grooves 3b will differ from each other. Thus, the magnitudes of the contact angles βo and βi with the respective grooves 3b are respectively set in accordance with the distances Lo and Li so as to ensure a constant thrust force (βo>βi), thereby maintaining at fixed values the differential limiting forces exerted on the two disc plates 3.

Figure 10:
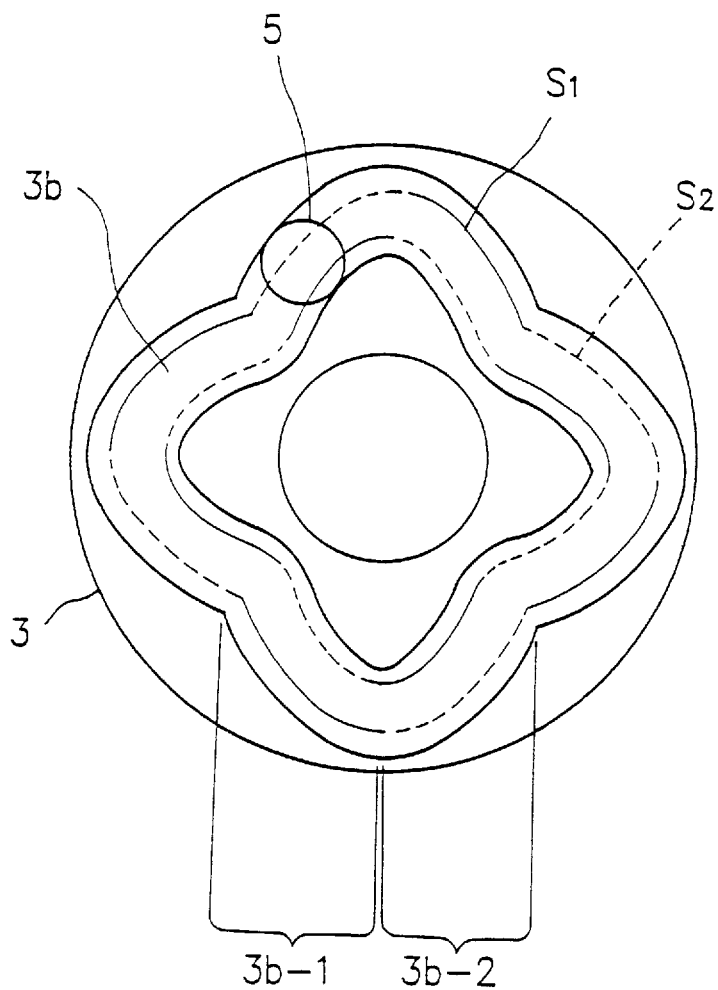
FIG. 10 is a front elevational view of a disc plate showing a contact line between the ball and the groove.
Figure 11A:
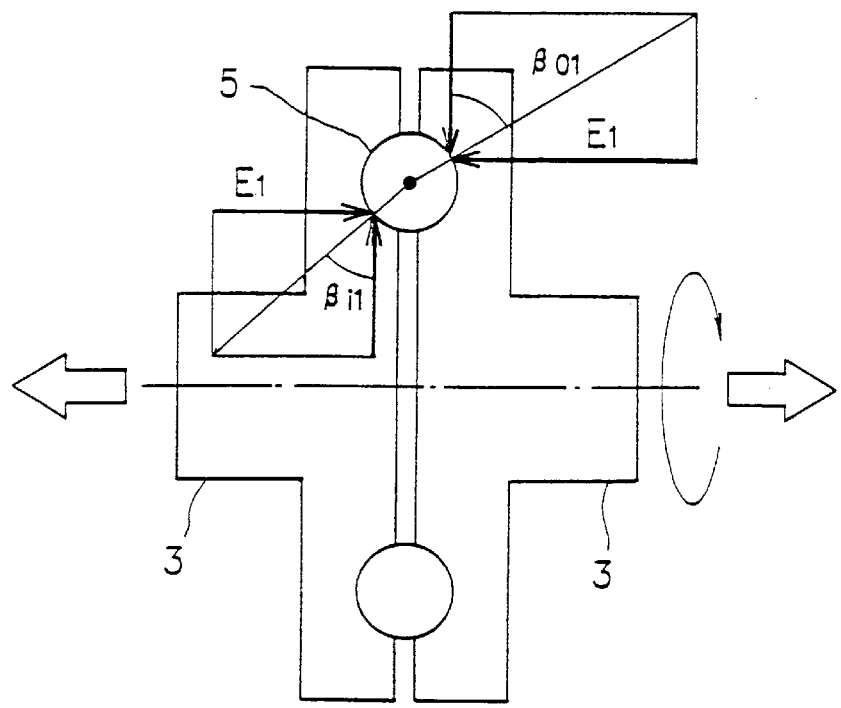
FIGS. 11($a$) and 11($b$), hereinafter collectively referred to as "FIG. 11", are an explanatory view of the action of the force based on the difference in direction of the rotational force transmission.
Figure 11B:
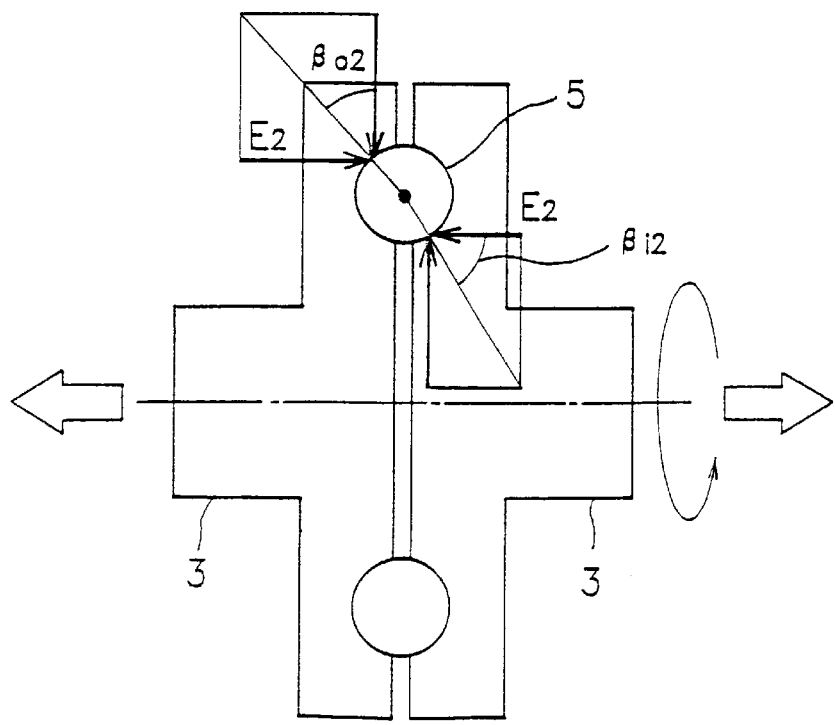

It is to be appreciated in the above configuration that the direction of rotational force transmission between the gear case 1 and the disc plates 3 at acceleration of the automobile is different from that at deceleration, with the result that positions of contact of the ball 5 with the grooves 3b at acceleration will also differ from those at deceleration. More specifically, as shown in FIG. 10, in one direction of transmission the balls 5 roll along a contact line S1 indicated by a solid line, that is, in contact with radially outer side of the disc plate 3 in the first guide segment 3b-1 but with radially inner side of the disc plate 3 in the second guide segment 3b-2. In the other direction of transmission the balls 5 roll along a contact line S2 indicated by a broken line, that is, in contact with radially inner side of the disc plate 3 in the first guide segment 3b-1 but with radially outer side of the disc plate 3 in the second guide segment 3b-2. For this reason, in this embodiment, an angle of contact of the ball 5 with the groove 3b in the one direction of rotational force transmission is set to be different from that in the other direction of transmission. Let βo1 and βi1 be the outer contact angle and the inner contact angle, respectively, in the first guide segment 3b-1, and let βo2 and βi2 be the outer contact angle and the inner contact angle, respectively, in the second guide segment 3b-2. If βo1>βo2 and βi1>βi2, then a thrust force E1, namely, a reaction force acting along the rotational axis in the one direction of rotational force transmission as shown in FIG. 11(a) become larger than a thrust force E2 in the other direction of rotational force transmission as shown in FIG. 11(b). This will result in a generation of differential limiting forces having different magnitudes, respectively, in the one direction and in the other direction of rotational force transmission.

Thus, according to the differential gear of this embodiment configured to permit any difference between speeds of rotation of the two disc plates 3 by means of a groove 3b formed in each disc plate 3 and a plurality of balls 5 engaging with each groove 3b, angles of contact of the balls 5 with the grooves 3b in the first guide segment 3b-1 of the grooves 3b are set to be different from those in the second guide segment 3b-2 so that the magnitude of reaction force which the ball 5 imparts to the grooves 3, that is, the magnitude of the differential limiting force in one direction of rotational force transmission can differ from that in the other direction of transmission. As a result of this, there can be generated differential limiting forces having any different magnitudes respectively at acceleration and at deceleration of the automobile so as to ensure accurate coping with automobile travel performances, purposes of use, or compatibility with attached mechanisms.

Figure 12:
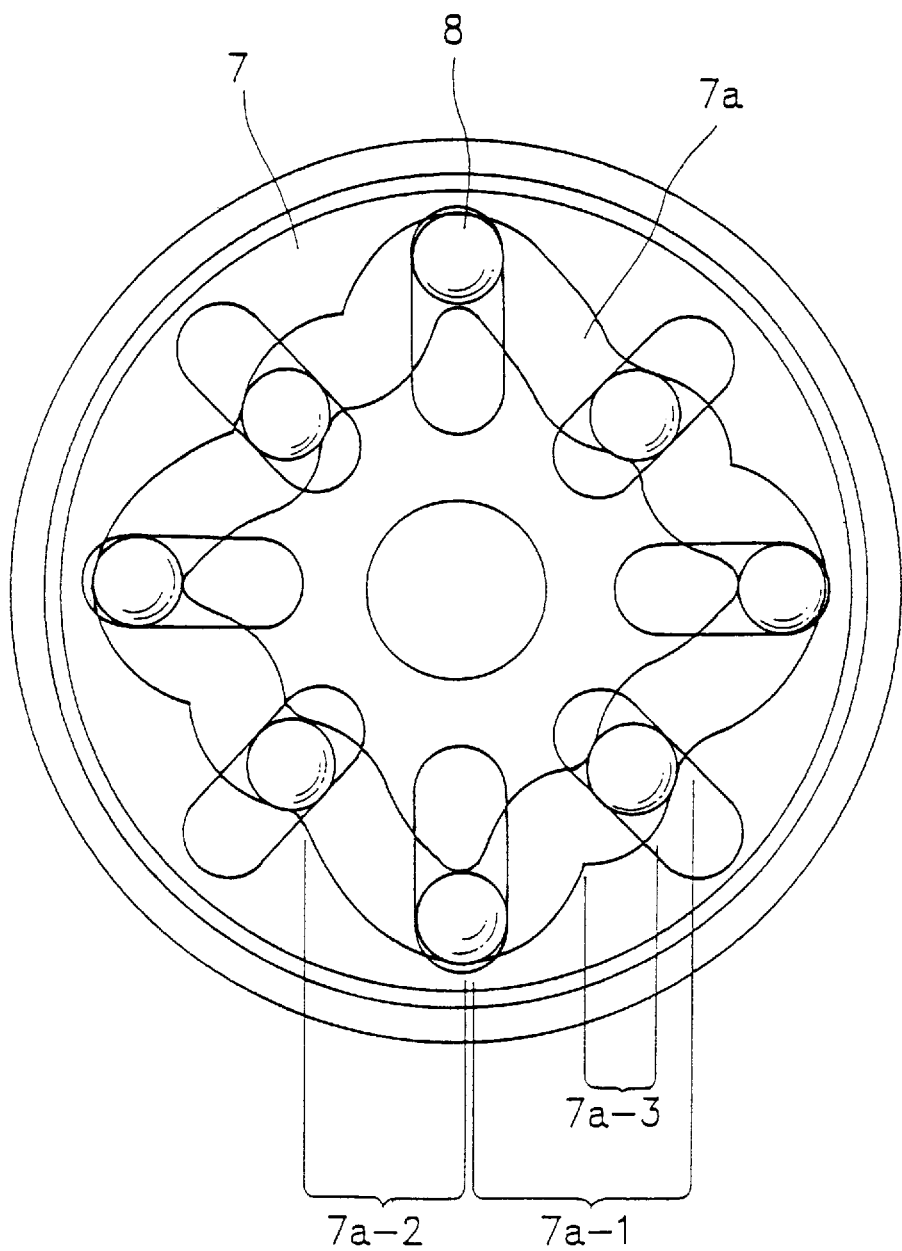
FIG. 12 is a front elevational view of the disc plate showing a variant of the groove.
Figure 13:
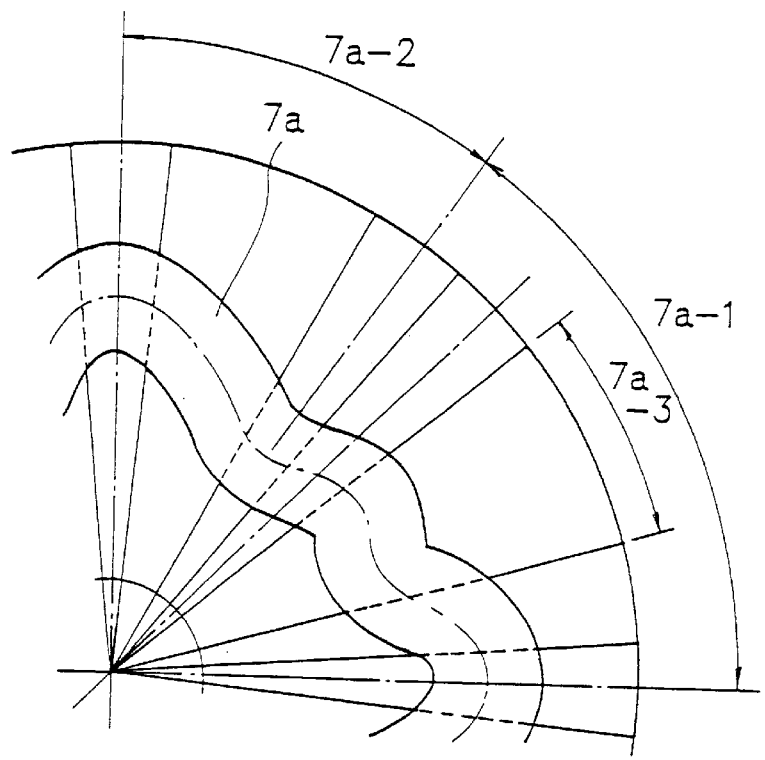
FIG. 13 is an enlarged view of the groove.
Figure 14:
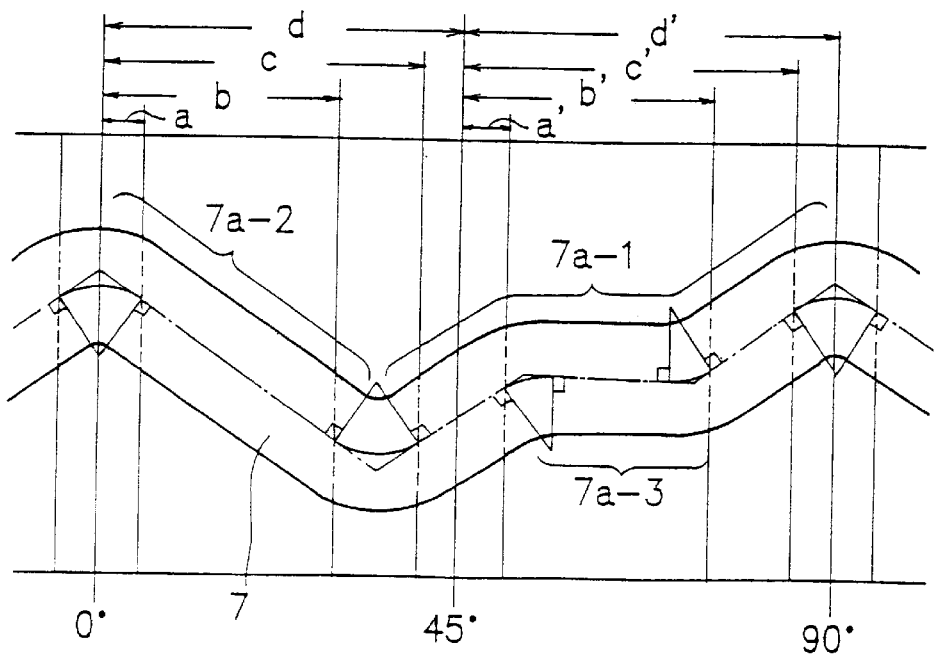
FIG. 14 is an explanatory view of the groove developed into a planar state.

FIGS. 12 to 14 illustrate a variant of the groove formed in the disc plate of the first embodiment. In the diagrams, reference numerals 7, 7a and 8 denote a disc plate, a groove and a ball, respectively. The groove 7a includes a first guide segment 7a-1 in which the ball 8 is moved from radially inner side of the disc plate 7 toward outer side thereof; a second guide segment 7a-2 in which the ball 8 is moved from radially outer side toward inner side; and a third guide segment 7a-3 in which the ball 8 is held at a position within a radially predetermined range (at a radially fixed position in this case), the three segments being continuous in the circumferential direction. The first guide segment 7a-1 and the second guide segment 7a-2 are so formed as to have the same magnitude of angle of contact with the ball 8. In one disc plate 7 the third guide segment 7a-3 is shown included within the first guide segment 7a-1, whereas in the other disc plate not shown the third guide segment 7a-3 is included within the second segment 7a-2. Thus, in the same manner as the above embodiment, when turning points on one side (on the inside or outside) are coincident with each other in the pair of confronting disc plates 7, turning points on the other side become displaced relative to each other. The groove 7a is so formed as to allow the ball 8 to radially reciprocate one time through 90° of rotational angle of the disc plate 7. FIG. 13 illustrates the rectilinearly developed groove 7a. Although no force transmission is effected between the ball 8 and the groove 7a at the radial turning points and in the third guide segment 7a-3, the groove 7a will ensure a generation of a certain thrust force in the force transmitting segments in which the magnitude of angle of contact with the ball 8 is constantly unvaried. More specifically, the groove 7a is generally formed so that conditions $a \leq a'$, $b \geq b'$, $c \leq c'$ and $d = d'$, are satisfied in FIG. 14 and that when some balls 8 lie at force non-transmitting positions the other balls 8 lie at force transmitting positions, thereby accomplishing a generation of a constantly unvaried thrust force irrespective of the magnitude of the rotational angle of the disc plate 7. In this case, the radially outside contact angle and the radially inside contact angle of the disc plate 7 in the first guide segment are set to be different respectively in magnitude from the radially outside contact angle and the radially inside contact angle of the same in the second guide segment 7a-2, whereby in the same manner as the above embodiment the differential limiting forces can be generated which differ in magnitude between one transmission direction of rotational force and the other transmission direction.

Figure 15:
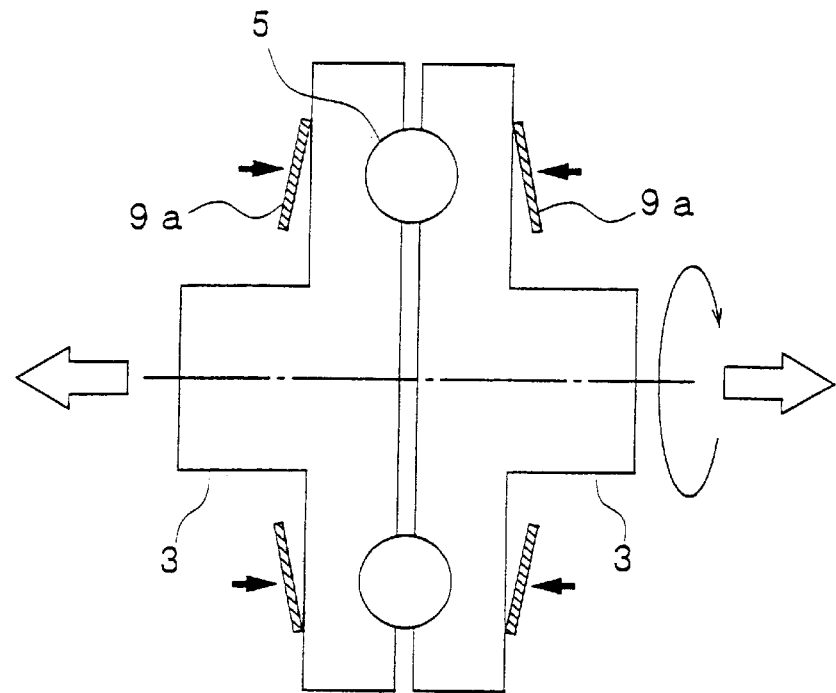
FIG. 15 is a schematic view showing a variant of the first embodiment.
Figure 16:
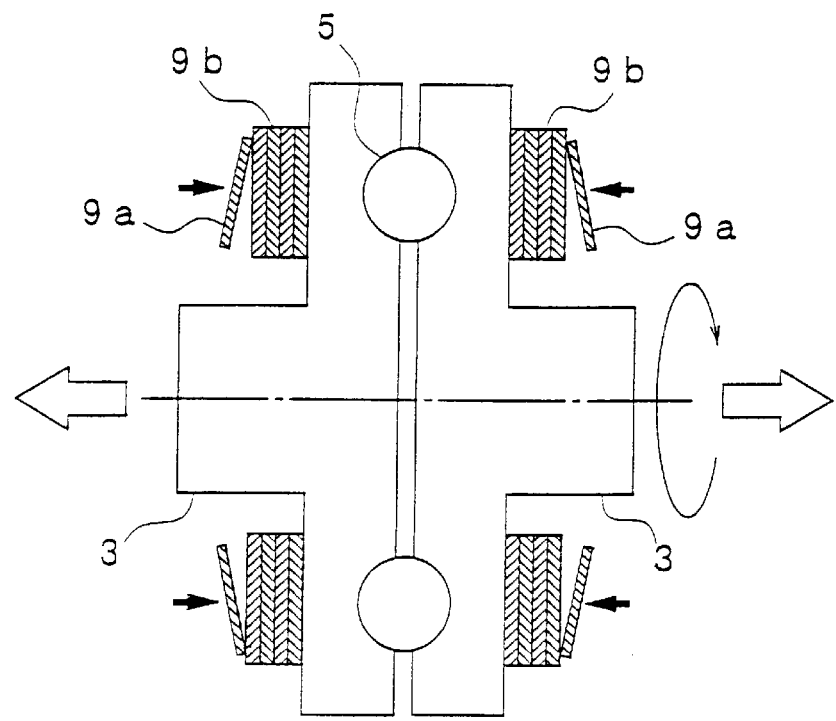
FIG. 16 is a schematic view showing another variant of the first embodiment.

It will be understood that the differential limiting effect lowers when a predetermined torque bias ratio is exceeded in the configuration limiting the differential by means of torque response as in the above embodiment. For this reason, as shown in FIG. 15, a spring washer 9a may be provided on the back of each of the disc plates 3 so as to axially inwardly urge the associated disc plates 3. Pre-load of the spring washer 9a can positively assist the differential limiting force so that effective differential limiting effect is ensured even on the road surface having a low friction coefficient. As shown in FIG. 16, a multiple disc clutch 9b may be disposed between the disc plates 3 and the associated spring washers 9a so as to allow the multiple disc clutch 9b to be subjected to a frictional force attributable to axially outward reaction force caused in the disc plates 3 as well as rotation of the disc plates 3, thereby obtaining a more powerful differential limiting force. In this case, the multiple disc clutch 9b is comprised of a known mechanism consisting of a plurality of clutch discs secured alternately to the gear case 1 and the disc plate 3, and the spring waster 9a may be excluded.

Figure 17:
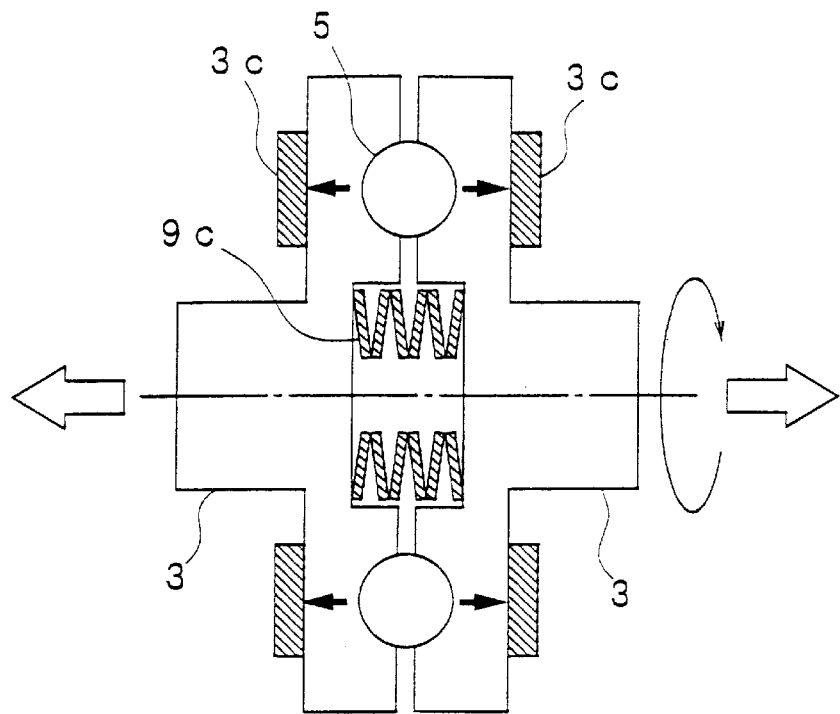
FIG. 17 is a schematic view showing a further variant of the first embodiment.
Figure 18:
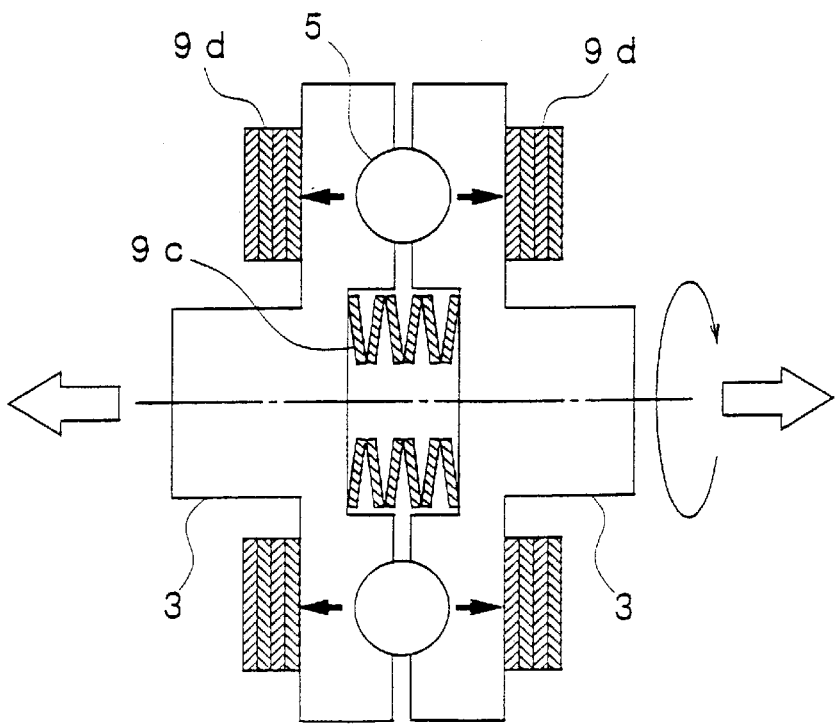
FIG. 18 is a schematic view showing still another variant of the first embodiment.
Figure 19:
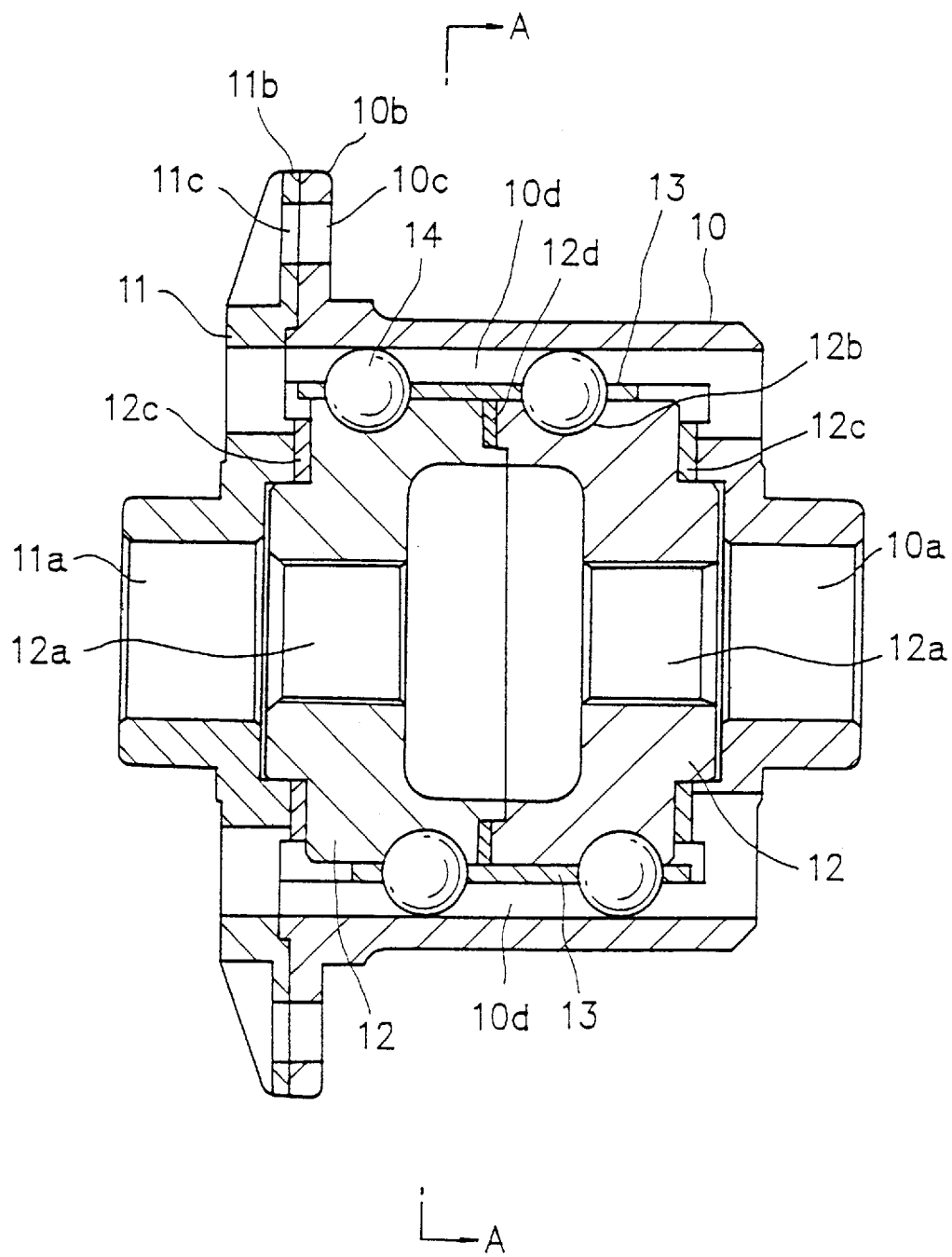
FIG. 19 is a side sectional view of a differential gear of a second embodiment of the present invention.
Figure 20:
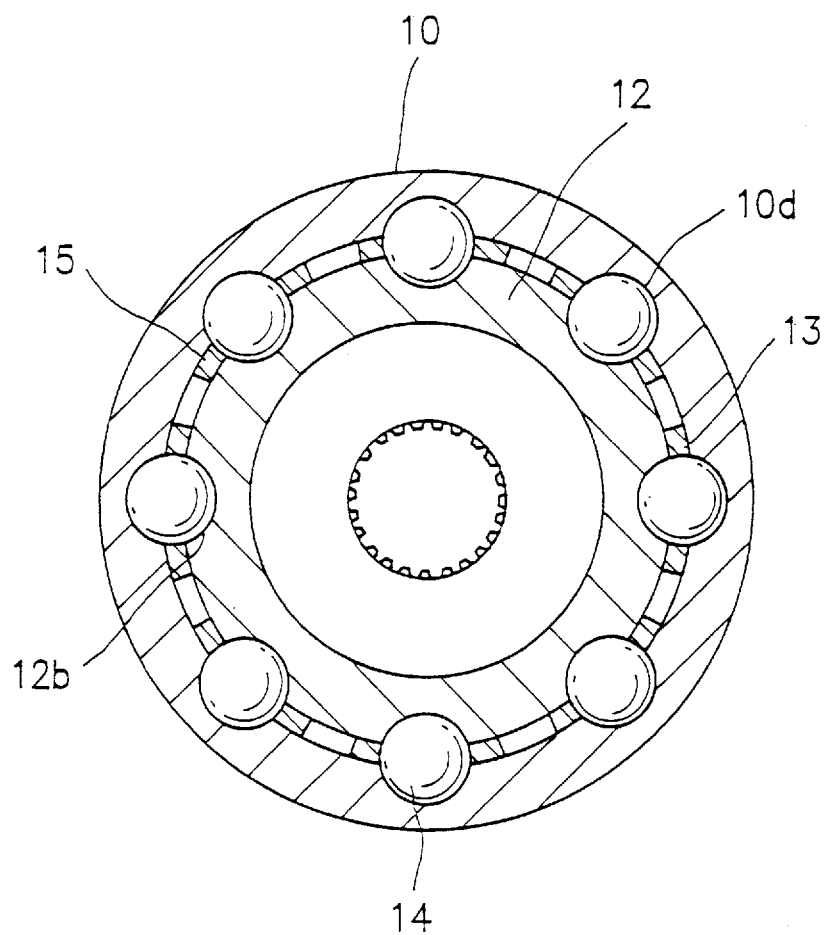
FIG. 20 is a sectional view taken along a line A—A of FIG. 19 and viewed from the direction of the arrow.
Figure 21:
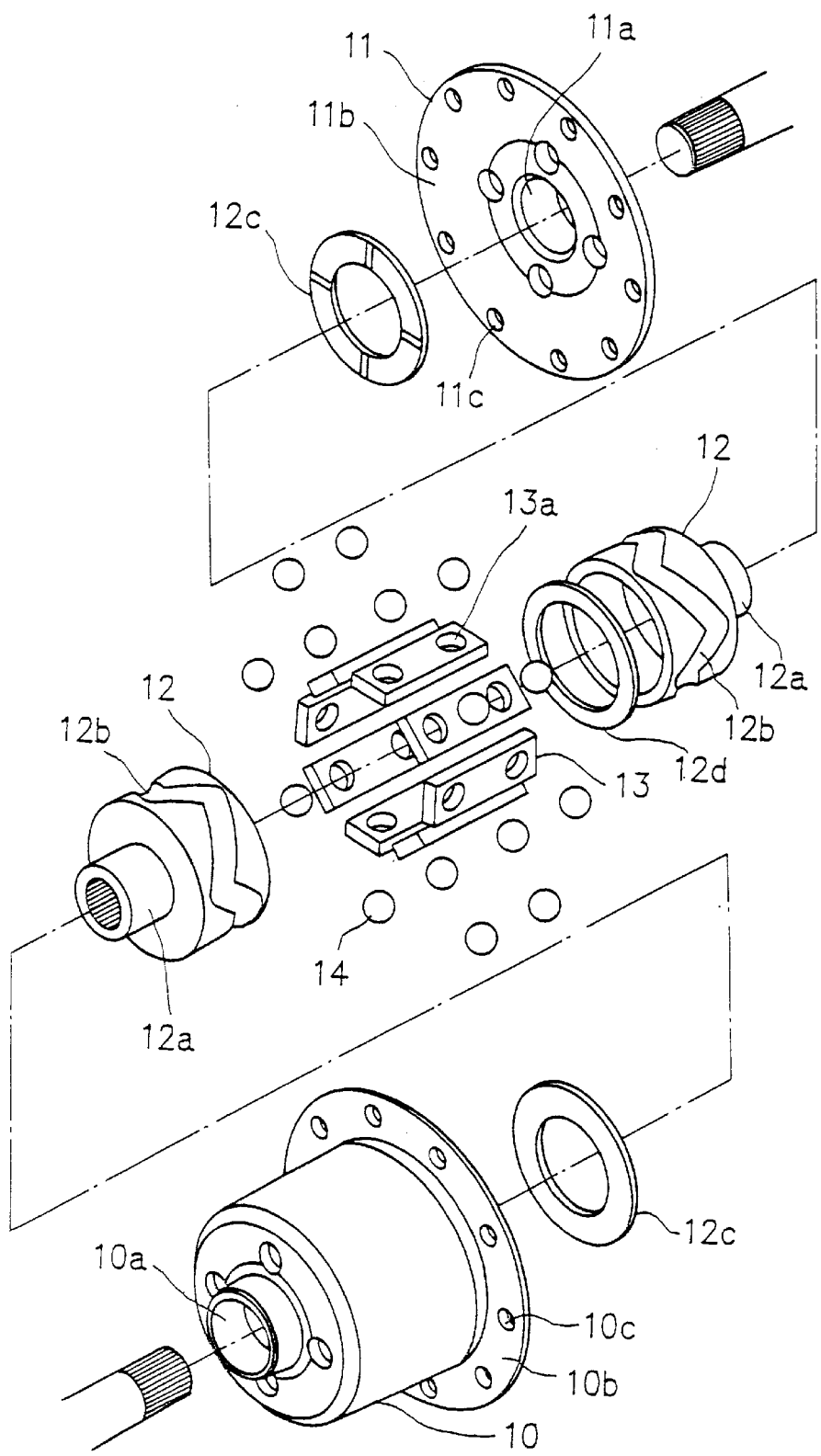
FIG. 21 is an exploded perspective view of the differential gear.

Referring further to FIG. 17, a plurality of spring washers 9c are provided which are stacked within recesses formed in the confronting faces of the two disc plates 3 and by means of which the disc plates 3 are urged axially outward. A pre-load can thus be generated due to the frictional force with the thrust washer 3c. A multiple disc clutch 9d may be mounted on the back of the disc plates 3 as shown in FIG. 18 so as to allow the multiple disc clutch 9d to receive a pre-load from the spring washer 9c, thereby making it possible to obtain a more powerful differential limiting force.

Reference is now made to FIGS. 19 to 28 which illustrate a second embodiment of the present invention in a non-limitative manner.

A differential gear of this embodiment comprises a gear case 10; a gear case cover 11 for closing one end of the gear case 10; a pair of coaxially arranged ball discs 12; a multiplicity of ball holders 13 interposed between the pair of ball discs 12; and a multiplicity of balls 14 rollingly retained in the ball holders 13; the ball discs 12, the ball holders 13 and the balls 14 serving respectively as rotary elements, holding elements and rolling elements.

The gear case 10 is in the shape of a cylinder with one open end and has at its center a bearing 10a which supports one of the pair of ball discs 12. The gear case 1 includes a circumferentially extending flange 10b provided with a multiplicity of holes 10c for insertion of bolts. The gear case 10 further includes a multiplicity of grooves 10d which are formed in its inner peripheral surface and with which the balls 14 are engaged. The grooves 10d extend rectilinearly in the direction of axis of the gear case 10 and are circumferentially equally spaced apart from one another.

The gear case cover 11 is shaped into a disc having at its center a bearing 11a which supports the other of the ball discs 12. The gear case cover 11 includes a circumferentially extending flange 11b provided with a multiplicity of holes 11c for insertion of bolts. The gear case cover 2 is mounted on the gear case 1 by means of bolts for fastening the flanges 1b and 2b together.

Figure 22:
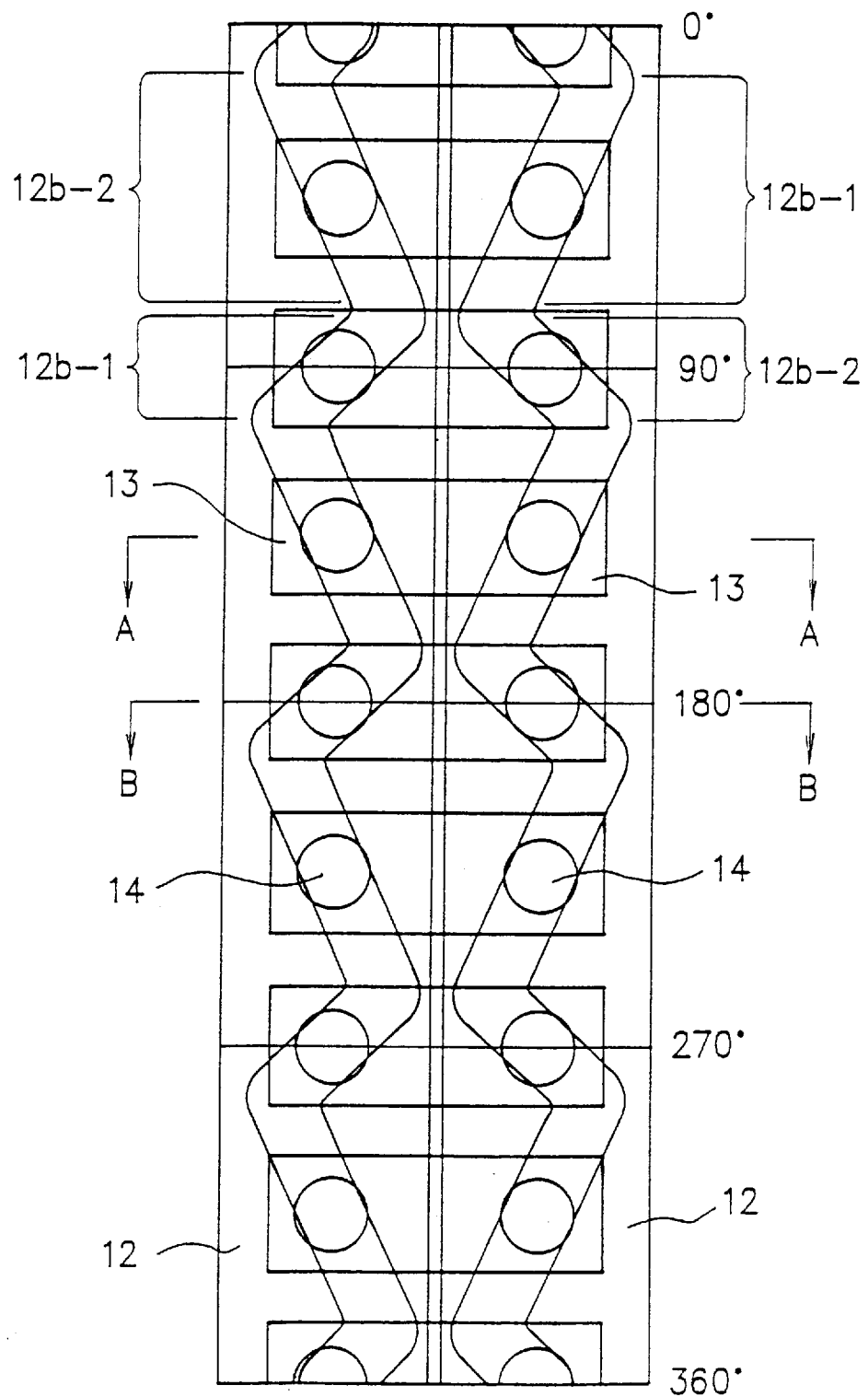
FIG. 22 is a development of the groove.
Figure 23A:
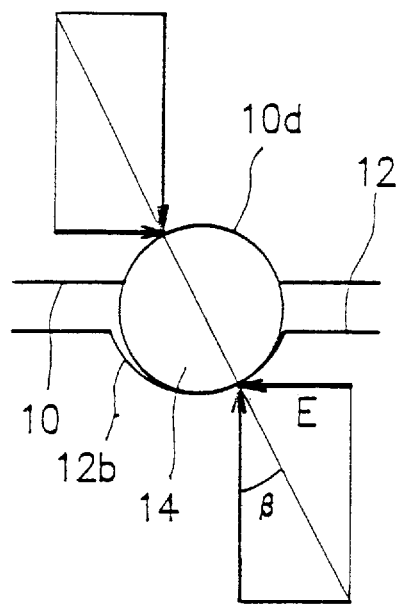
FIGS. 23($a$) and 23($b$), hereinafter collectively referred to as "FIG. 23", are sectional views of the groove taken along lines A—A and B—B and viewed from the directions of arrows.
Figure 23B:
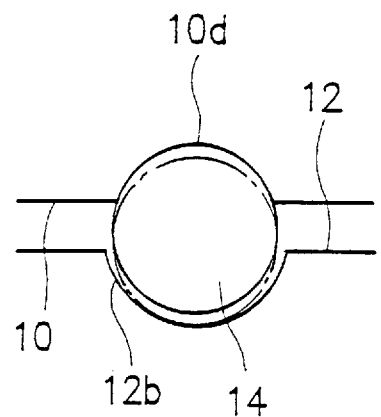
Figure 24:
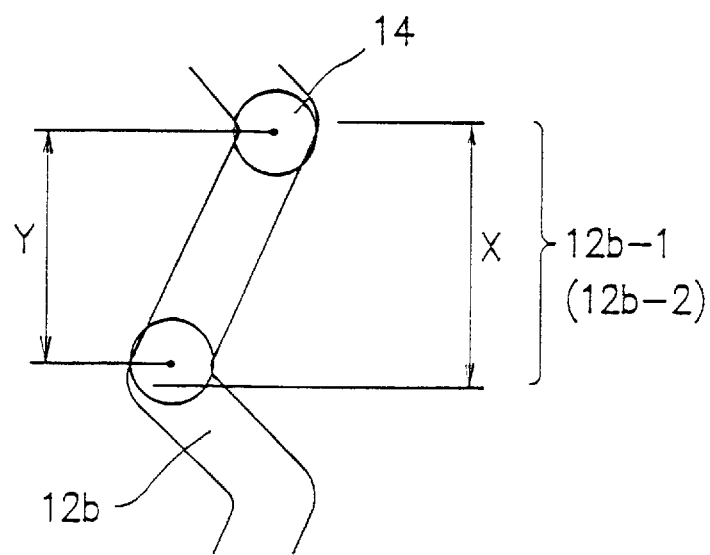
FIG. 24 is a top plan view of the groove.

The ball discs 12 are each shaped into a cylinder having at its one end a connection 12a for receiving the drive shaft associated with the wheel. The two ball discs 12 have the same outer diameter and respective one end faces confronting each other. The external peripheral surface of each ball disc 12 is provided with a circumferentially extending groove 12b with which the balls 14 are rollingly engaged, the groove 12b being continous without any interruption. A thrust washer 12c is arranged between the gear case 10 and the confronting end faces of the ball discs 12, with another thrust washer 12d located between the confronting end faces of the ball discs. FIG. 22 illustrates the pair of ball discs 12 each developed into a planar state, where angles 0° to 360° represent circumferential positions. Each groove 12b has a first guide segment 12b-1 in which the balls 14 are caused to move from axially one end side of the ball disc 12 toward the other end side, and a second guide segment 12b-2 in which the balls 5 are caused to move from axially the other end side toward the one end side, the first and second segments being arranged alternately and continuously with each other. In one disc plate 3 the first guide segment 12b-1 is longer in circumferential direction than the second guide segment 12b-2, whereas in the other disc plate 3 the second guide segment 12b-2 is longer in circumferential direction than the first guide segment 12b-1. In the same manner as the first embodiment, this means that when turning points on one sides in the axial direction of the grooves 12b are circumferentially coincident with each other in the ball discs 12, turning points on the other sides are circumferentially displaced relative to each other. In the section taken along a line A—A of FIG. 22, that is, in a circumferentially longer guide segment 12b-1 (or 12b-2), the groove 12b of the ball disc 12 is so formed that the balls 14 are allowed to be in contact with both the groove 10d of the gear case 10 and the groove 12b of the ball disc 12 as shown in FIG. 23(a). On the contrary, in the section taken along a line B—B of FIG. 22, that is, in a circumferentially shorter guide segment 12b-2 (or 12b-1), the groove 12b of the ball disc 12 is more deeply formed so as not to allow the balls 14 to simultaneously come into contact with both the groove 10d of the gear case 10 and the groove 12b of the ball disc 12 as shown in FIG. 23(b). By virtue of this configuration, no rotational force is transmitted by way of balls 14 between the gear case 10 and the ball disc 12 in the circumferentially shorter guide segment 12b-2 (or 12b-1). Although not shown in this case, smooth transitions are conferred on boundaries between the guide segments 12b-2 and 12b-1. As is clear from FIG. 24, length X of the circumferentially longer guide segment 12b-1 (or 12b-2) of the groove 12b is greater to some extent than interval Y between two balls 14 adjoining each other so that one or two balls 14 can at all times lie within the circumferentially longer guide segment 12b-1 (or 12b-2).

Referring back to FIG. 21, the ball holders 13 are each in the form of a plate extending from the peripheral surface of one of the ball discs 12 to the peripheral surface of the other of the ball discs 12 and are slidably interposed between the gear case 10 and the ball discs 12. Each ball holder 13 includes two holes 13a for respectively receiving a ball 14 closer to one of the ball discs 12 and another ball 14 closer to the other of the ball discs 12. The ball holders 13 each reciprocate in the axial direction of the ball discs 12 with two balls 14 closer to respective ball discs 12 being retained at a predetermined interval.

The balls 14 are individually received in the holes 13a of the ball holders 13 and are each engaged with the groove 10d of the gear case 10 and the groove 12b of the ball disc 12 corresponding thereto.

In the thus constructed differential gear, generation of a difference between speeds of rotation of the two ball discs 12 would allow the balls 14 to roll by the guidance of the grooves 12b of the ball discs 12 and to reciprocate together with the ball holders 13 in the direction of axis of the ball discs 12. If at that time only one of the ball discs 12 is caused to be rotated from the drive shaft side, the differential will be limited by reaction forces which the grooves 12b impart to the balls 14 in the same manner as the first embodiment.

Figure 25A:
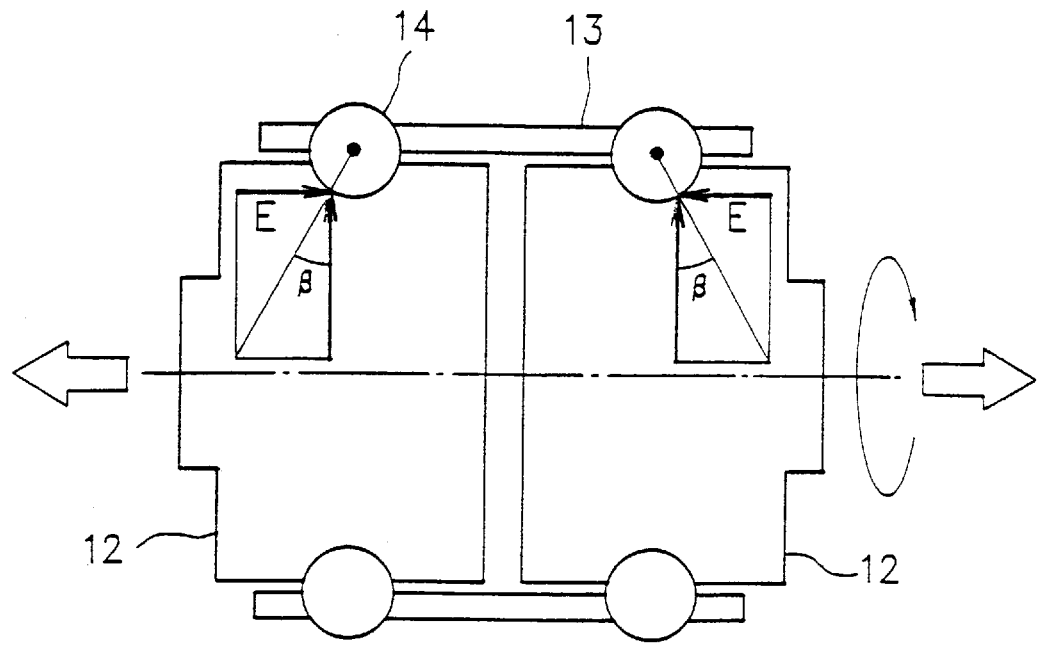
FIGS. 25($a$) and 25($b$), hereinafter collectively referred to as "FIG. 25", are an explanatory view of action of the force based on the difference in direction of the rotational force transmission.
Figure 25B:
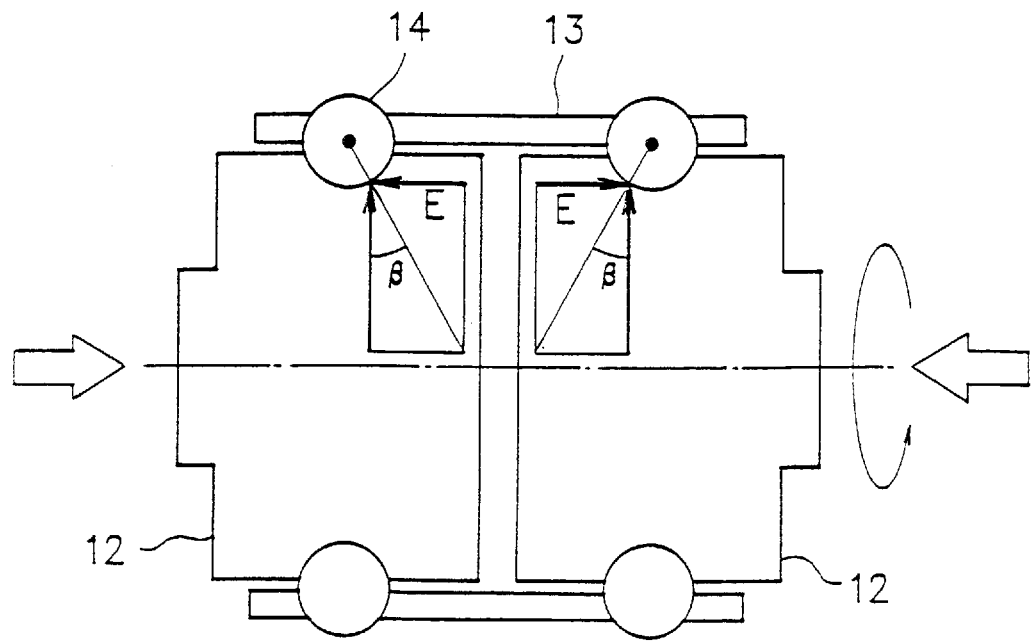
Figure 26A:
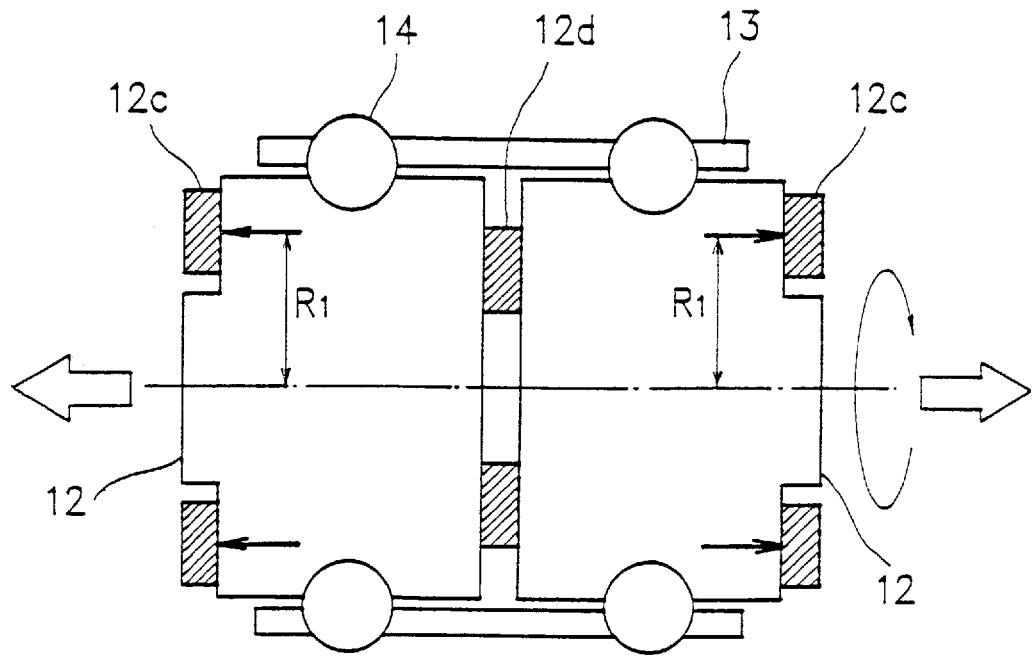
FIGS. 26($a$) and 26($b$), hereinafter collectively referred to as "FIG. 26", are an explanatory view of action of the force based on the difference in direction of the rotational force transmission.
Figure 26B:
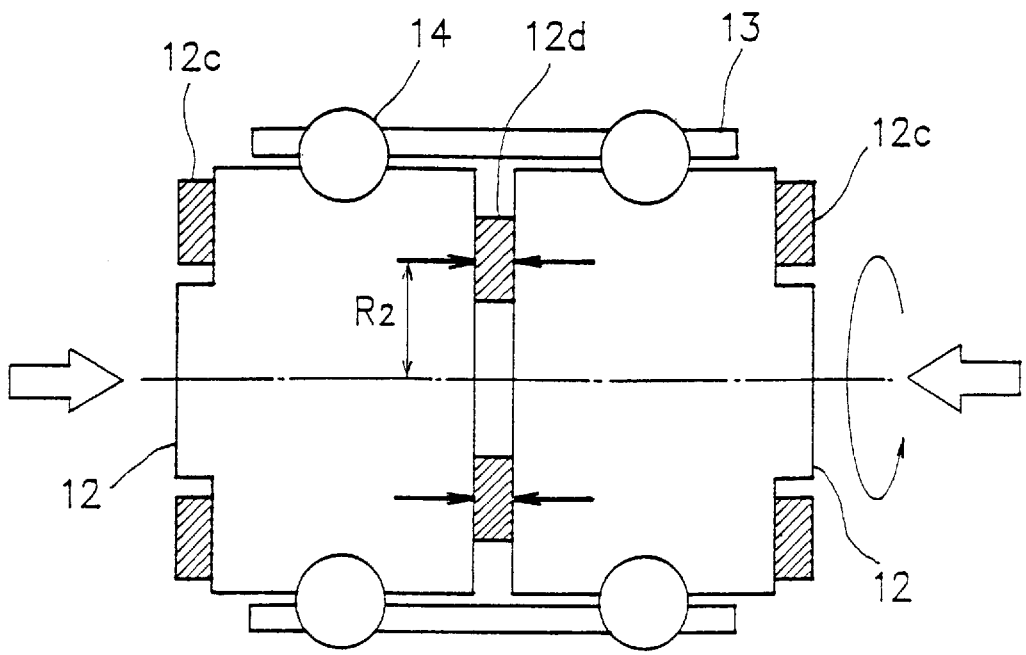

It is to be understood that in the first embodiment construction the reaction force acting directions were the same (that is, direction of the axis of rotation) irrespective of the rotational force transmitting directions whereas in the second embodiment construction the reaction force acting directions become opposite to each other if the rotational force transmitting directions differ from each other. When the balls 14 in the grooves 12b come into contact with the axially outer side of each of the ball discs 12, the latter is forced to move axially outwardly as depicted in FIG. 25(a). On the contrary, when the balls 14 in the grooves 12b come into contact with axially inner side of each of the ball discs 12, the latter is forced to move axially inwardly as depicted in FIG. 25(b). In the construction of this embodiment, therefore, if the ball discs 12 are urged by the thrust force E to move axially outwardly as depicted in FIG. 26(a), a differential limiting force will be given birth to by a friction force generated between the ball discs 12 and the thrust washers 12c arranged on opposite ends of the ball discs 12. On the contrary, if the ball discs 12 are urged by the thrust force E to move axially inwardly as depicted in FIG. 26(b), another differential limiting force will be given rise to by a friction force generated between the ball discs 12 and the thrust washer 12d interposed between the two ball discs 12. Let R1 be a distance from the centers of frictional surfaces of the thrust washers 12c on the axially outer side to the axis of rotation and R2 be a distance from the center of a frictional surface of the thrust washer 12d on the axially inner side to the axis of rotation. In this case the longer the distance from a force acting point to the center of rotation is, the torque becomes greater. It would thus be possible by setting these distances to be R1>R2 that the differential motion limiting force in one rotational force transmitting direction is made larger than that in the other rotational force transmitting direction.

The above construction is such that in the circumferentially shorter guide segment 12b-2 (or 12b-1) there is no transmission of rotational force by way of the balls 14 between the gear case 10 and the ball discs 12 so that reaction forces between the balls 14 and grooves 12b can be generated at all times only in the circumferentially longer guide segment 12b-1 (or 12b-2). As a result of this, in one rotational force transmitting direction all of the thrust forces E act toward one axial direction, whereas in the other rotational force transmitting direction all of the thrust forces E act toward the other axial direction, thus resulting in constantly stabilized differential limiting force irrespective of the directions of transmission of rotational force. In this case, arrangement is such that at least one ball 14 is allowed to transmit a rotational force in the circumferentially longer guide segment 12b-1 (or 12b-2), thereby ensuring a secure action of this embodiment.

In the construction of the second embodiment in this manner, different rotational force transmission directions will lead to opposite reaction force acting directions. It would thus be possible to effect a more secure setting of the magnitude of the differential limiting force in accordance with the rotational force transmitting directions, by altering the characteristics of the friction members arranged on their respective rotational force transmitting direction sides.

Figure 27A:
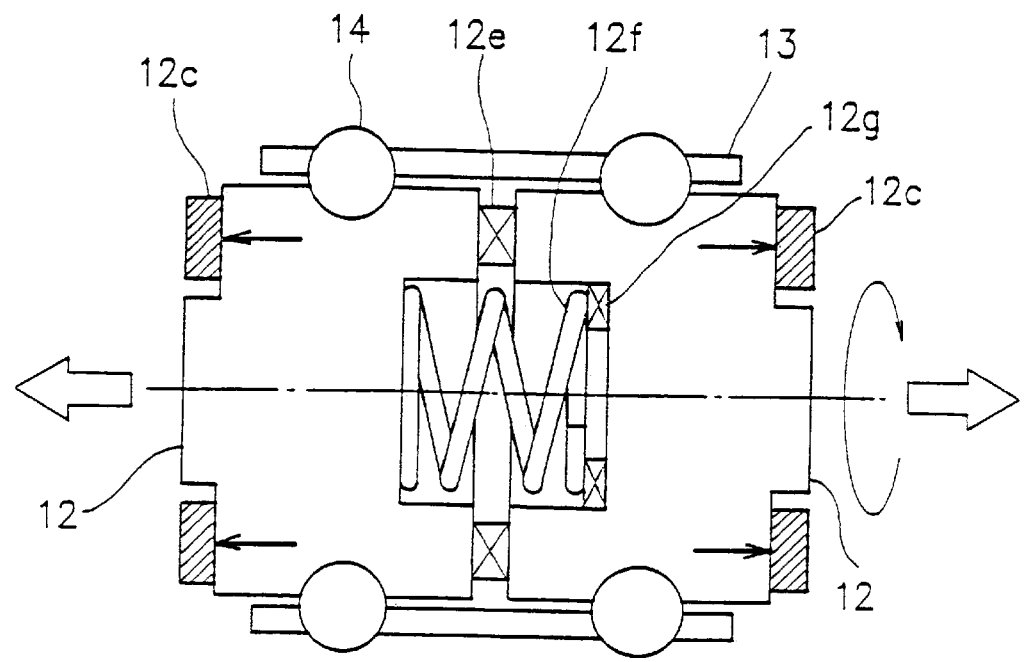
FIGS. 27($a$) and 27($b$), hereinafter collectively referred to as "FIG. 27", are a schematic views showing a variant of the second embodiment.
Figure 27B:
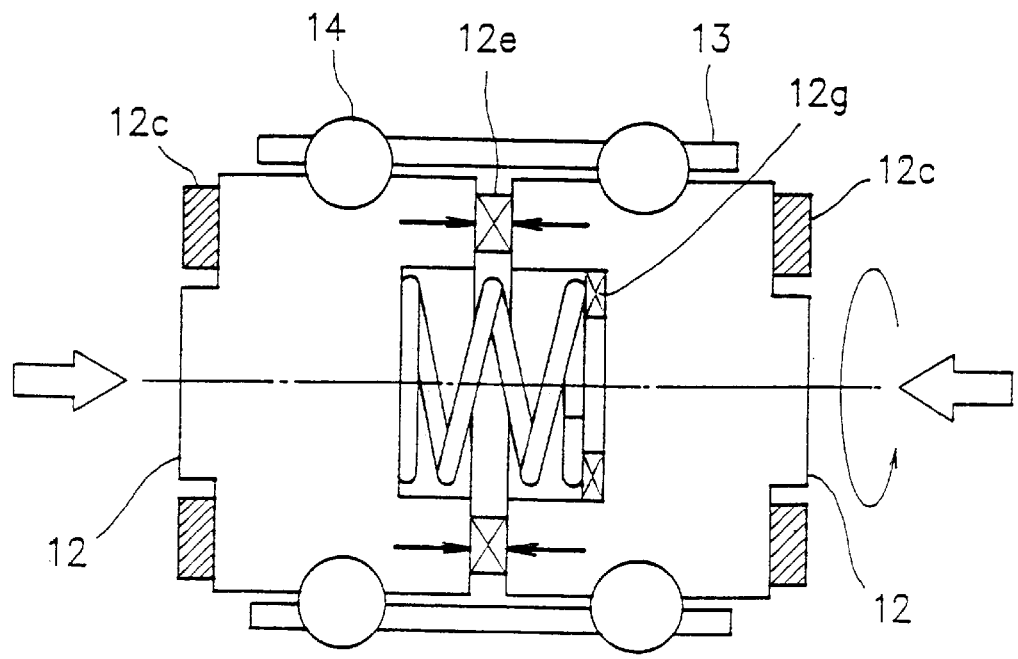
Figure 28:
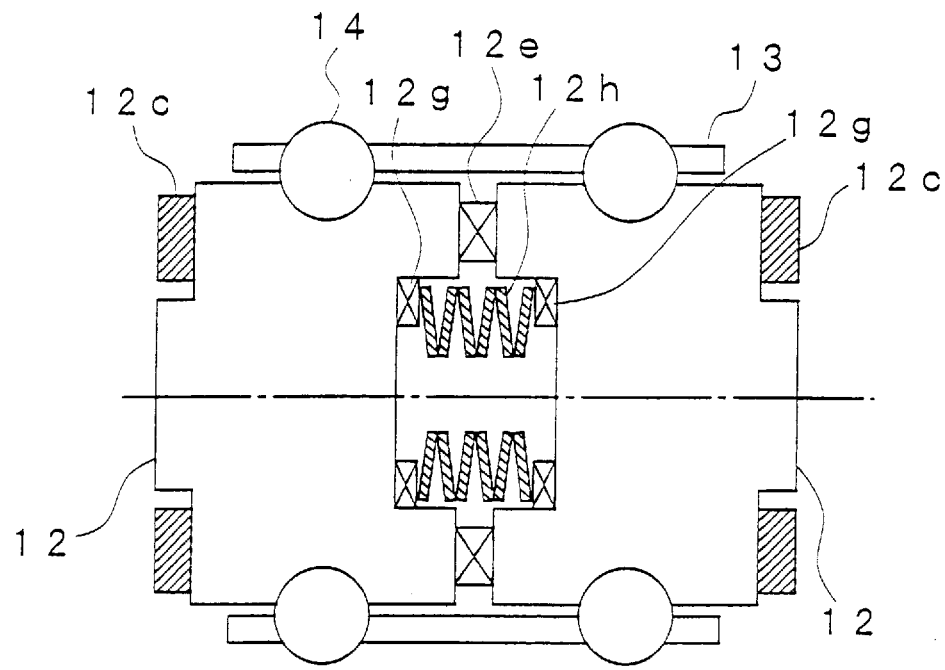
FIG. 28 is a schematic view showing another variant of the second embodiment.
Figure 29:
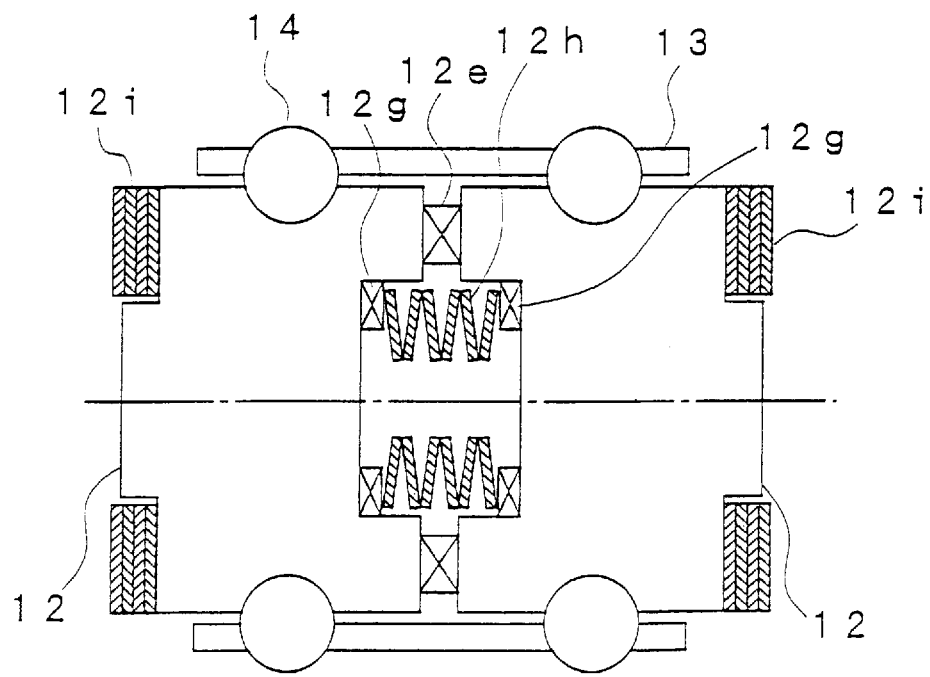
FIG. 29 is a schematic view showing a further variant of the second embodiment.

With the aim of enlarging the difference between differential limiting forces in the two rotational force transmitting directions, as shown in FIG. 27, the second embodiment construction may employ between the two ball discs 12 a bearing 12e ensuring smooth sliding motions of the ball discs 12 and a spring 12f urging the ball discs 12 radially outwardly. More specifically, when the ball discs 12 are forced to move axially outwardly as depicted in FIG. 27(a), the ball discs 12 are pressed against the thrust washers 12c not only by the thrust force but also the pre-load of the spring 12f, the resultant friction force giving rise to a greater differential limiting force. On the contrary, when the ball discs 12 are forced to move axially inwardly as depicted in FIG. 27(b), a sliding friction acting between the two ball discs 12 is reduced by virtue of the bearing 12e interposed between the two ball discs 12 and of a bearing 12g disposed between one end of the spring 12f and associated one of the ball disk 12, resulting in a lessened differential limiting force. Accordingly, due to a positive assist for the differential limiting force by the pre-load of the spring 12f, an effective presentation is ensured of the differential force limiting effect even on the surface of a road having a lower friction coefficient. Since in this case the above construction enables the differential limiting force to be reduced in the other rotational force transmitting direction in spite of imparting of the pre-load, there can be solved the problems of locking of drive wheels at the time of deceleration of the automobile, in other words, the problems in combination with the anti-lock braking system (ABS). It is to be noted that the spring 12f may be replaced as shown in FIG. 28 by a plurality of spring washers 12h stacked on top of one another, with the bearings 12g being disposed on both ends of the spring washer assembly 12h. Multiple disc clutches 12i may also be provided as shown in FIG. 29 on the opposite surface sides of the ball discs 12 so that friction force may arise in the multiple disc clutches 12i due to the axially outward reaction force which the ball discs 12 undergo and to the rotation of the ball discs 12, thus obtaining a more powerful differential limiting force. In this case, the spring washer 12h may be excluded.

Figure 30A:
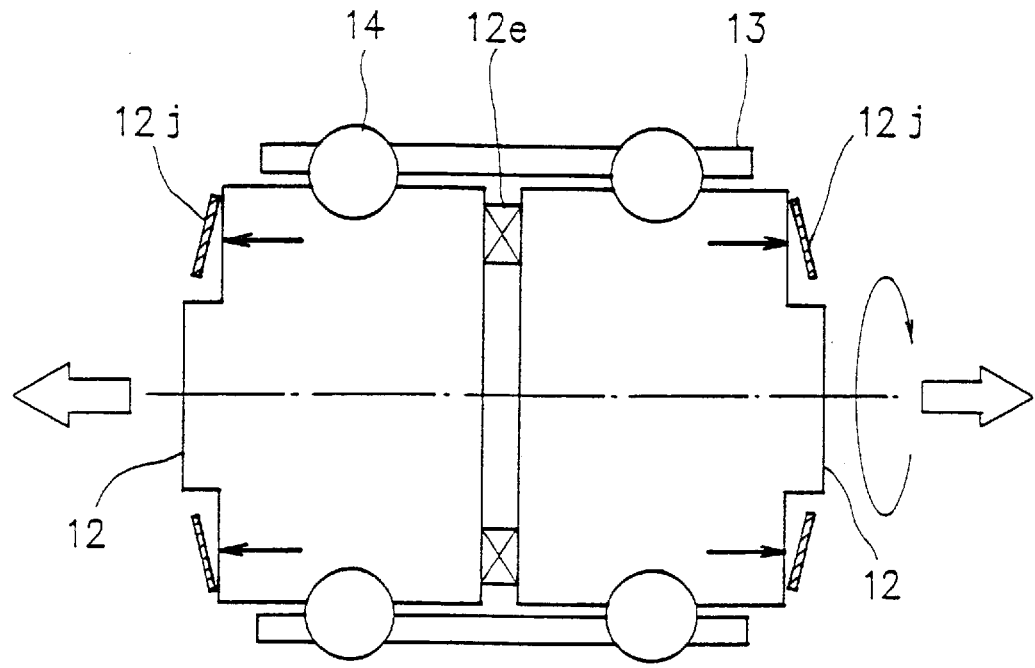
FIGS. 30($a$) and 30($b$), hereinafter collectively referred to as "FIG. 30", are schematic views showing still another variant of the second embodiment.
Figure 30B:
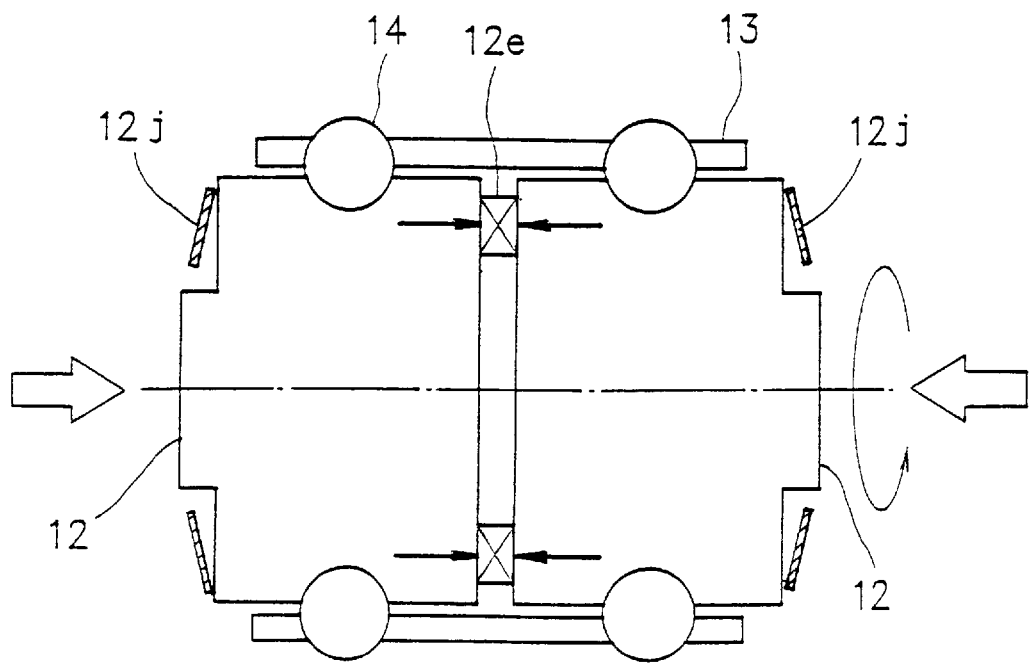

In the configuration employing the bearing 12e interposed between the two ball discs 12, spring washers 12j may be provided on the opposite end sides of the ball discs 12 for urging the ball discs 12 axially inwardly as shown in FIG. 30, whereby in one rotating direction of rotational force as shown in FIG. 30(a) a differential limiting force is generated due to pre-loads of spring washers 12j and frictional force and whereby in the other rotating direction of rotational force as shown in FIG. 30(b) the differential limiting force is reduced due to the presence of the bearing 12e, thus achieving the same effect as in the above.

Figure 31:
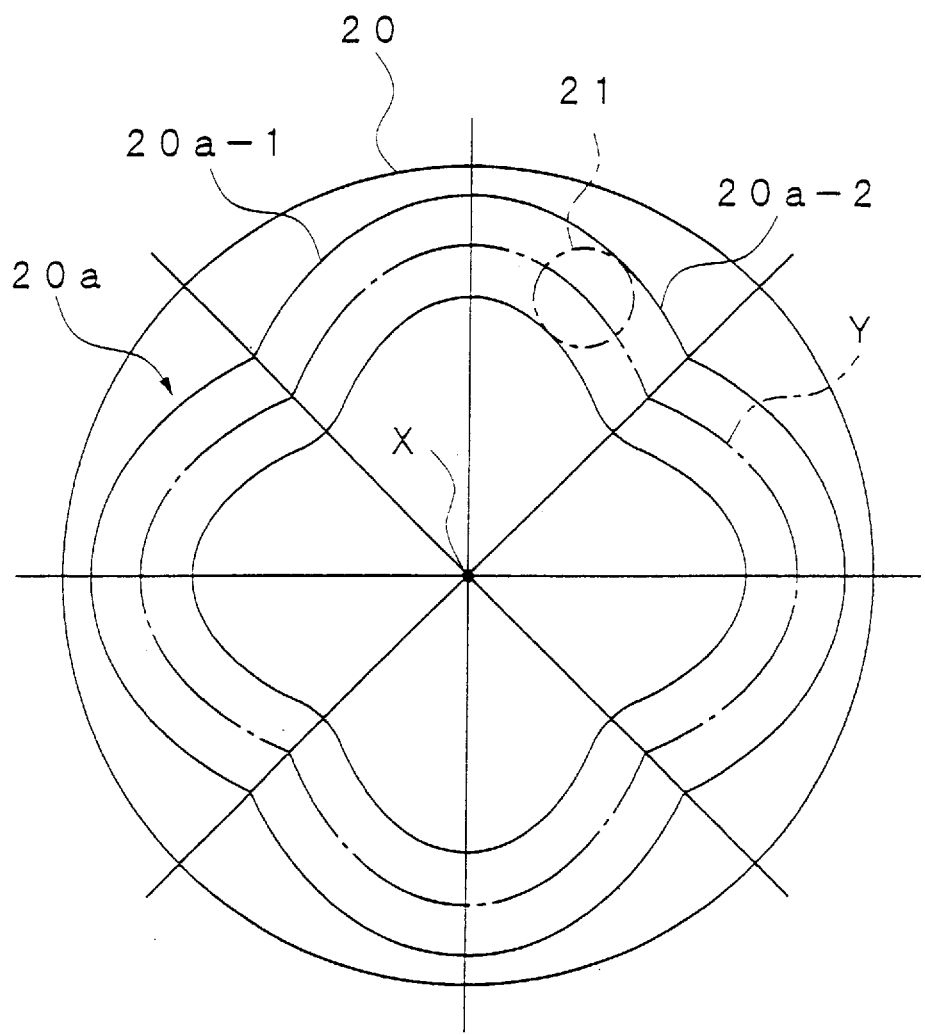
FIG. 31 is a front elevational view of a disc-like member for use in the differential gear according to the first embodiment.
Figure 32:
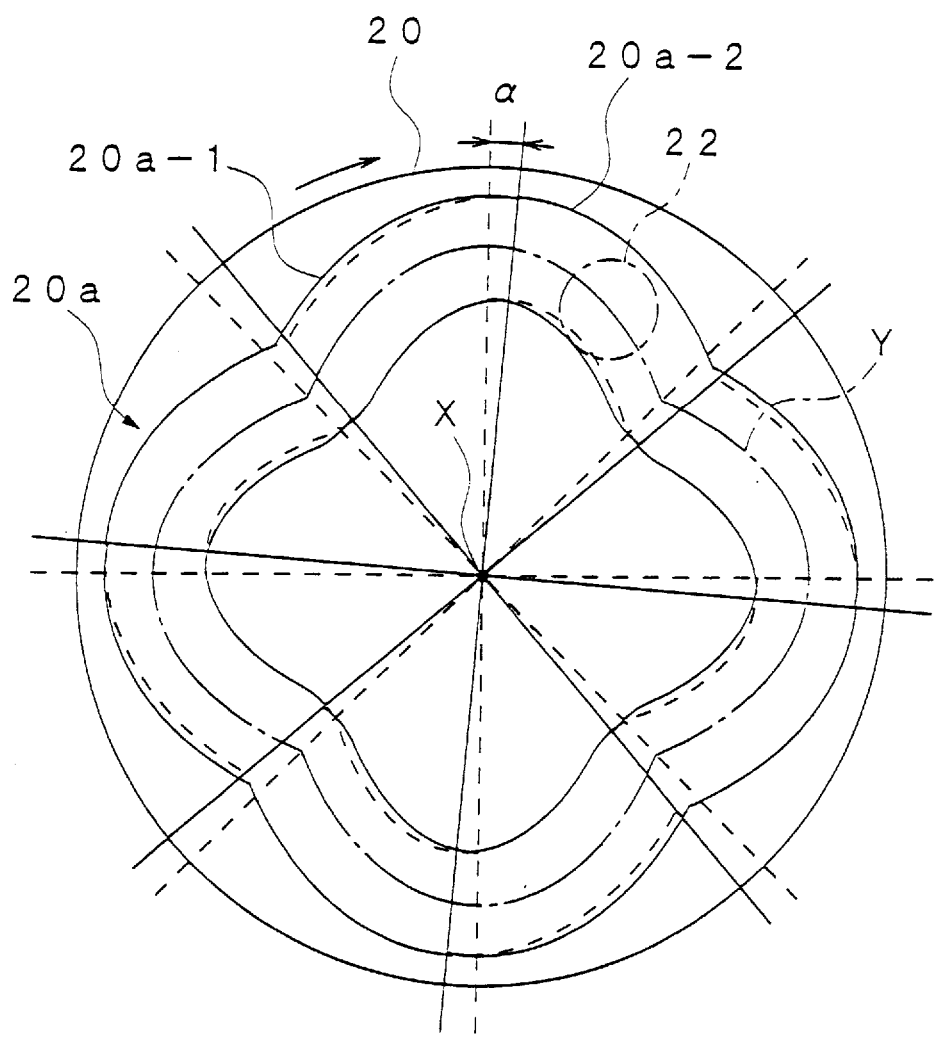
FIG. 32 is a front elevational view of the disc-like member.
Figure 33:
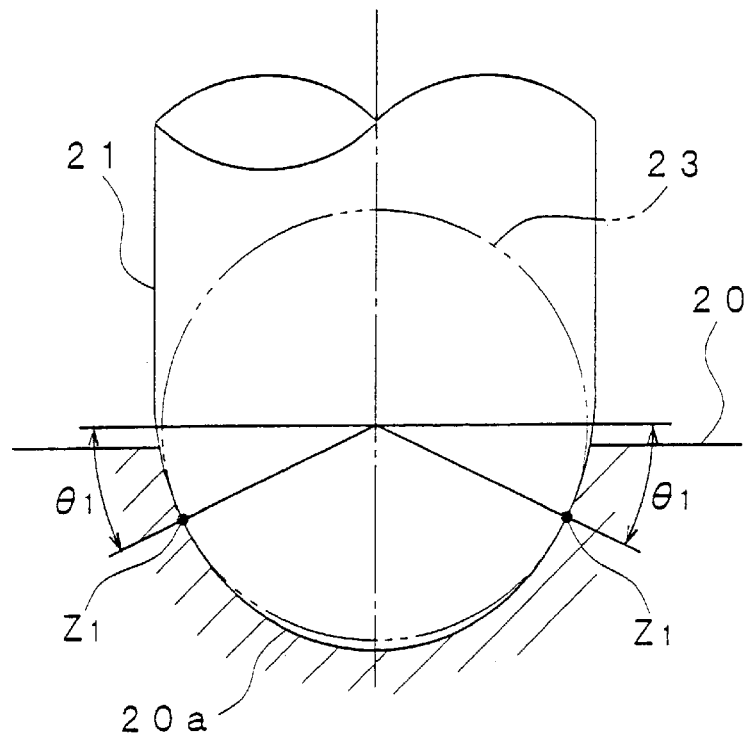
FIG. 33 is an enlarged view of a machined portion.
Figure 34:
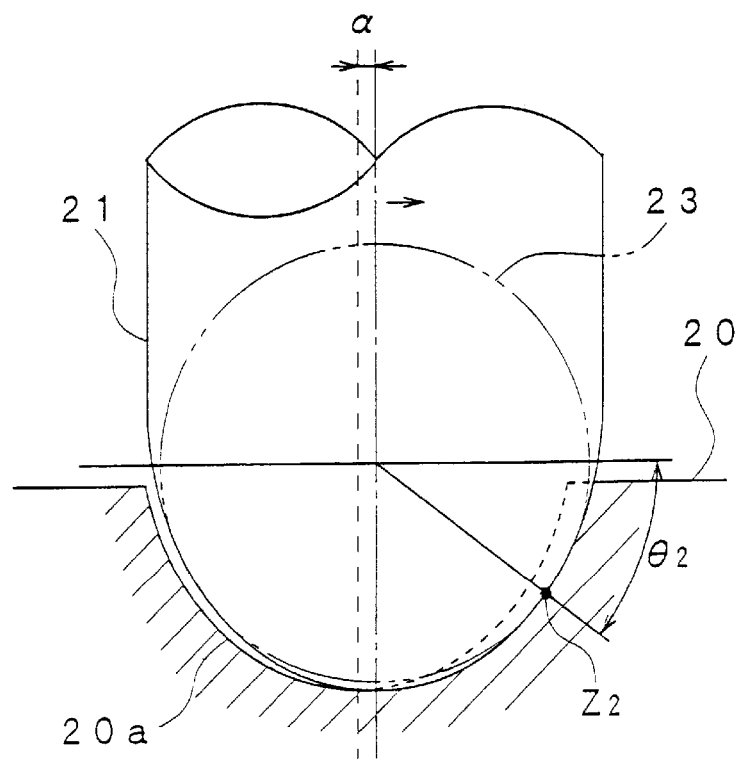
FIG. 34 is another enlarged view of the machined portion.

Referring finally to FIGS. 31 to 34, there is depicted a process for machining constituent parts of the first embodiment differential gear. FIGS. 31 and 32 are front elevational views of a disk-like member to be fashioned into the disc plate, and FIGS. 33 and 34 are enlarged views of a machined portion.

Description will now be given of a process of this embodiment for forming a groove 20a defined so as to have a difference between ball contact angles in one rotational force transmitting direction and the other transmitting direction, the groove 20a being formed in one end face of the disk-like member 20 to be shaped into the disk plate serving as a rotary element, by use of a first cutting blade 21 having a curved bottom edge of a predetermined form and a second cutting blade 22 having a curved bottom edge different in form from that of the first cutting blade 21.

More specifically, in the part machining process of this embodiment, the first cutting blade 21 is first moved by use of e.g., a numerically controlled machining apparatus along a predetermined cutting path Y around a axis of the disc-like member 20 as shown in FIG. 31, to thereby cuttingly form in the one end face of the disc-like member 20 in circumferentially continuous manner a groove 20a-1 extending from the radially inner side of the disc-like member 20 toward the outer side thereof and a groove 20a-2 extending from the radially outer side of the disc-like member 20 toward the inner side thereof. A groove 20a is thus formed which has contact angles θ1 at contact points Z1 with a reference circle 23 identical in diameter to the ball as shown in FIG. 33.

The disc-like member 20 is then displaced around its axis X in the rotational direction by a predetermined minute angle α as shown in FIG. 32, and the second cutting blade 22 is moved along the same cutting path Y as that of the first cutting blade 21. In consequence, the second cutting blade 21 acts to cut the radially outer side of the groove 20a-1 on one hand and the radially inner side of the groove 20a-2 on the other hand in the groove 20a (indicated by a chain-dotted line in FIG. 32) formed by the first cutting blade 21, with the result that the surface machined by the second cutting blade 21 has a contact angle θ2 (>θ1) at a contact point Z2 with the reference circle 23 as shown in FIG. 34. The groove 20a is thus configured in such a manner that the contact angles θ1 and θ2 with balls alternately differ in magnitude between on the radially inner and outer sides of the grooves 20a-1 and 20a-2.

What is claimed is:

1. A differential gear comprising: an input-side rotary element which is rotated by an external drive force; a pair of rotary elements confronting each other and arranged coaxially with said input-side rotary element; a plurality of rolling elements interposed between confronting faces of said rotary elements; and a retainer element rotating integrally with said input-side rotary element for retaining said plurality of rolling elements; said retainer element including a plurality of elongated holes extending in the radial direction of said pair of rotary elements, said plurality of elongated holes movably accommodating said plurality of rolling elements in a corresponding manner, said confronting faces of said pair of rotary elements being each provided with a groove with which each of said rolling elements is rollingly engaged, wherein the magnitudes of angles of contact with said rolling elements in said grooves are so set that when the directions of rotational force transmission between said input-side rotary element and said rotary elements differ from each other, the magnitudes of axial reaction forces generated between said rolling elements and said grooves are also different from each other; and further wherein said grooves formed in said rotary elements each include a first guide segment extending from the radially inner side of said rotary element toward the outer side thereof, and a second guide segment extending from the radially outer side of said rotary element toward the inner side thereof, said first and second guide segments being circumferentially continuous with each other, and wherein the magnitude of angles of contact with said rolling elements in said grooves are so set that it is larger on the radially inner side in one guide segment than on the radially inner side in the other guide segment and that it is smaller on the radially outer side in one guide segment than on the radially outer side in the other guide segment.

2. A differential gear comprising: an input-side rotary element which is rotated by an external drive force; a pair of rotary elements confronting each other and arranged coaxially with said input-side rotary element; a plurality of rolling elements interposed between confronting faces of said rotary elements; and a retainer element rotating integrally with said input-side rotary element for retaining said plurality of rolling elements; said retainer element including a plurality of elongated holes extending in the radial direction of said pair of rotary elements, said plurality of elongated holes movably accommodating said plurality of rolling elements in a corresponding manner, said confronting faces of said pair of rotary elements being each provided with a groove with which each of said rolling elements is rollingly engaged, wherein the magnitudes of angles of contact with said rolling elements in said grooves are so set that when the directions of rotational force transmission between said input-side rotary element and said rotary elements differ from each other, the magnitudes of axial reaction forces generated between said rolling elements and said grooves are also different from each other; and further wherein pressure imparting means urges said rotary elements axially inwardly at a predetermined pressure.

3. A differential gear comprising: an input-side rotary element which is rotated by an external drive force; a pair of rotary elements confronting each other and arranged coaxially with said input-side rotary element; a plurality of rolling elements interposed between confronting faces of said rotary elements; and a retainer element rotating integrally with said input-side rotary element for retaining said plurality of rolling elements; said retainer element including a plurality of elongated holes extending in the radial direction of said pair of rotary elements, said plurality of elongated holes movably accommodating said plurality of rolling elements in a corresponding manner, said confronting faces of said pair of rotary elements being each provided with a groove with which each of said rolling elements is rollingly engaged, wherein the magnitudes of angles of contact with said rolling elements in said grooves are so set that when the directions of rotational force transmission between said input-side rotary element and said rotary elements differ from each other, the magnitudes of axial reaction forces generated between said rolling elements and said grooves are also different from each other; and further wherein pressure imparting means urges said elements axially outwardly at a predetermined pressure.

4. A differential gear comprising: an input-side rotary element which is rotated by an external drive force; a pair of rotary elements confronting each other and arranged coaxially with said input-side rotary element: a plurality of rolling elements interposed between confronting faces of said rotary elements; and a retainer element rotating integrally with said input-side rotary element for retaining said plurality of rolling elements; said retainer element including a plurality of elongated holes extending in the radial direction of said pair of rotary elements, said plurality of elongated holes movably accommodating said plurality of rolling elements in a corresponding manner, said confronting faces of said pair of rotary elements being each provided with a groove with which each of said rolling elements is rollingly engaged, wherein the magnitudes of angles of contact with said rolling elements in said grooves are so set that when the directions of rotational force transmission between said input-side rotary element and said rotary elements differ from each other, the magnitudes of axial reaction forces generated between said rolling elements and said grooves are also different from each other; and further wherein frictional force generation means generates a frictional force by rotations of said rotary elements through the reception of axial reaction forces occurring in said rotary elements.

* * * * *